United States Patent [19]

Watanabe et al.

[11] Patent Number: 4,587,808
[45] Date of Patent: May 13, 1986

[54] CONTROL SYSTEM FOR HYDRAULIC CIRCUIT MEANS

[76] Inventors: Hiroshi Watanabe, Chiyoda-House, 1828-9-402, Oaza Niihari, Chiyodamura, Niihari-gun, Ibaraki-ken; Eiki Izumi, 2613-343, Oaza Shimoinayoshi, Chiyodamura, Niihari-gun, Ibaraki-ken; Yukio Aoyagi, Chiyoda-House, 1828-4-405, Oaza Niihari, Chiyodamura, Niihari-gun, Ibaraki-ken; Kazuo Honma, 3769-21, Ami, Amimachi, Inashiki-gun, Ibaraki-ken; Kichio Nakajima, Hitachitsukuba-House 2-406, 2625-3, Oaza Shimoinayoshi, Chiyodamura, Niihari-gun, Ibaraki-ken, all of Japan

[21] Appl. No.: 363,454

[22] Filed: Mar. 30, 1982

[30] Foreign Application Priority Data

Mar. 30, 1981 [JP] Japan ................................. 56-45386
Mar. 26, 1982 [JP] Japan ................................. 57-48336

[51] Int. Cl.$^4$ ........................................... F16D 31/02
[52] U.S. Cl. ...................................... 60/389; 60/390; 60/911; 318/311; 318/590
[58] Field of Search ...................... 60/389, 390, 911; 417/218; 318/311, 590, 591

[56] References Cited

U.S. PATENT DOCUMENTS 4,369,625 1/1983 Izumi et al. ......................... 60/422

Primary Examiner—Edward K. Look

[57] ABSTRACT

A control system for a hydraulic circuit having a variable displacement hydraulic pump, and an actuator driven by the pump, in which a pump control controls a displacement volume varying member of the pump based on an operating signal giving a command with respect to the position thereof and a detector signal indicative of the actual position thereof while restricting the operating speed of the member to a level below a predetermined maximum speed. The control system has maximum speed setting device previously setting a first predetermined maximum speed and a second predetermined maximum speed higher than the first predetermined maximum speed for the operating speed of the variable displacement volume varying member and operative to select the first predetermined maximum speed when the direction of operation of the actuator commanded by the operating signal agrees with the actual direction of operation thereof, and select the second predetermined maximum speed when the position of the displacement volume varying member commanded by the operating signal is neutral or when the direction of operation of the actuator commanded by the operating signal is opposite to the actual direction of operation thereof. The pump control is constructed to effect the speed control of the displacement volume varying member based on the first or second predetermined maximum speed selected by the maximum speed setting device.

9 Claims, 22 Drawing Figures

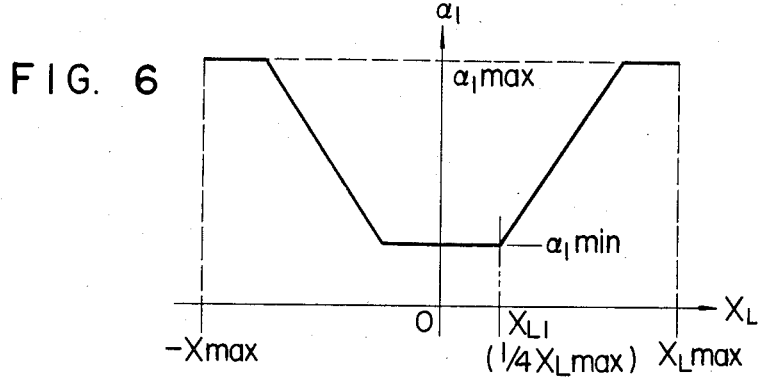
FIG. 6
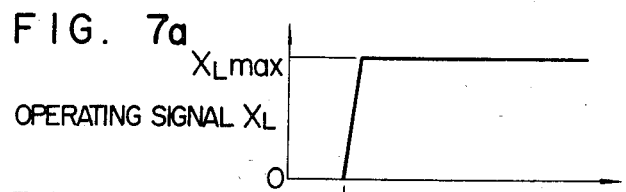
FIG. 7a
OPERATING SIGNAL $X_L$
FIG. 7b
SWASH PLATE POSITION SIGNAL $Y_L$
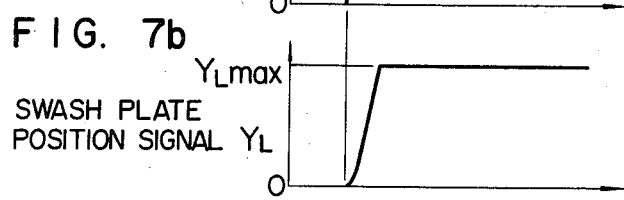
FIG. 8a
OPERATING SIGNAL $X_L$
FIG. 8b
SWASH PLATE POSITION SIGNAL $Y_L$
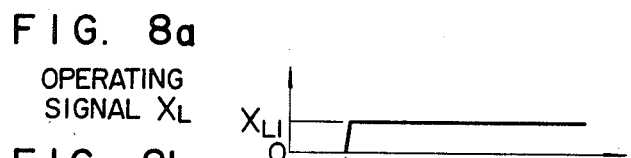
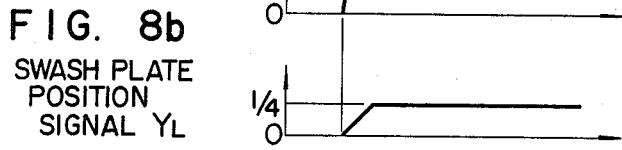

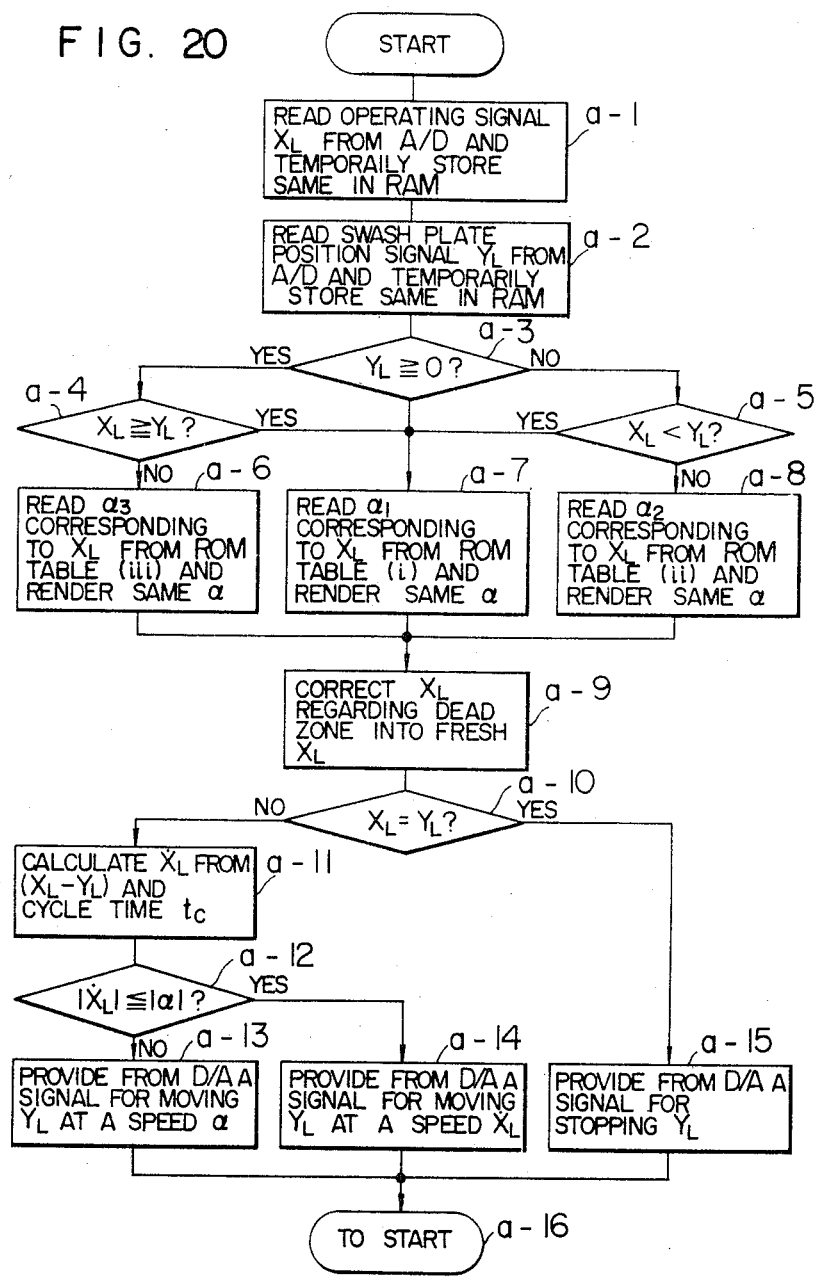

CONTROL SYSTEM FOR HYDRAULIC CIRCUIT MEANS

BACKGROUND OF THE INVENTION

This invention relates to control systems for hydraulic circuit means connecting together a variable displacement hydraulic pump and actuator means driven by the pump, with the operating speed of the actuator means being controlled by the position of a displacement volume varying member of the pump, and, more particularly, to a control system for hydraulic circuit means capable of effecting control of acceleration of the actuator means by restricting the operating speed of the displacement volume varying member of the pump to a level below a predetermined maximum speed.

A hydraulic circuit means has been proposed for connecting a variable displacement pump and an actuator driven by the pump, for example, for civil engineering and architectural machines, such as a hydraulic shovel, hydraulic crane, etc., and for hydraulic excavators for mining coals. In a hydraulic shovel, for example, working elements including a boom, a bucket, an arm, travelling members, swivelling member, etc., are driven by the actuator of the hydraulic circuit means which may be a hydraulic motor or a hydraulic cylinder. In this type of hydraulic circuit, the operating speed of the actuator is determined by the displacement volume of the pump. For example, if the displacement volume of the hydraulic pump is suddenly increased by rapidly actuating a displacement volume varying member or a swash plate of the pump connected to a boom cylinder at initial stages of boom operation, the forces moving the boom cylinder would be suddenly increased and give a shock thereto. When it is desired to decelerate the boom cylinder, a great shock also would be suffered if the displacement volume of the pump is suddenly reduced and the boom cylinder might become uncontrollable. Also, if such shock is given when the hydraulic machine is started, the operator would be jolted and the operating lever might become temporarily uncontrollable, thereby causing a hunting to occur.

To obviate the aforesaid problem, in, for example, Japanese Laid Open Patent Application No. 59006/81, it has been proposed to control the displacement volume varying member or swash plate of the variable displacement hydraulic pump while restricting the operating speed of the swash plate to a level below a predetermined maximum speed.

As aforesaid, in the hydraulic circuit means, the operating speed of the actuator is determined by the displacement volume of the pump. The displacement volume is decided by the position of the displacement volume varying member. In a swash-plate pump, the displacement volume varying member comprises a swash plate. Thus, in the hydraulic circuit means using a swash plate pump, the operating speed of the actuator may vary depending on the position of the swash plate, and acceleration of the actuator can be controlled by varying the operating speed of the swash plate.

In the control system of the prior art described hereinabove, when an operating signal indicative of a value for commanding the position of the swash plate is produced, an increasing rate or a decreasing rate of the position command value is compared with a predetermined maximum speed set beforehand. The result of this is that the position command value is increased or decreased at the predetermined maximum speed when the changing rate of the position command value is higher than the predetermined maximum value and at the changing rate of the position command value itself when the changing rate of the position command value is lower than the predetermined maximum speed, and then supplied as an output to swash plate drive means while being compared with the output of a displacement meter for detecting a position of the swash plate. Thus, the swash plate of the variable displacement hydraulic pump is controlled in such a manner that its position is shifted to a position designated by the command value of the operating signal while its operating speed is restricted to a level below the predetermined maximum speed. By effecting control in this way, it is possible to perform small shock and smooth operation of each of the working elements if the maximum operating speed is set at a value suiting each working element driven by the actuator. This is referred to as actuator acceleration control or swash plate speed control.

The predetermined maximum speed is set at a constant value for each operating member and should be set at a low level for a working element of high inertia, such as a boom and travelling members. Because of this, it is impossible to bring the working element of low predetermined maximum speed to a sudden halt when it is desired to stop it. Thus, for example, when a hydraulic machine is to be suddenly braked during travel, there is a great danger. Also, difficulties would be experienced in stopping the working element accurately in a desired position or suddenly reversing the direction of operation of the working element.

Moreover, the predetermined maximum speed is usually set at a suitable constant value at which the movement of the actuator or working element does not slacken and much shock is not caused as the operating lever is suddenly shifted from a neutral position to the full. Thus, the predetermined maximum speed is a value which is too high when the manipulated variable of the operating lever is small or when it is desired to perform a fine operation in which the operating speed of the hydraulic actuator is so low that a shock, no matter how small, will pose a problem. Thus, if the operating lever is suddenly actuated when such fine operation is performed, a shock will be suffered because the actuator is operated at the predetermined maximum speed. Also, in normal operation, an increase in pressure at actuator startup is influenced by the swash plate speed. Thus, if the aforesaid control process of the prior art is used, a peak pressure will be generated at actuator startup, thereby causing a shock.

SUMMARY OF THE INVENTION

This invention has been developed for the purpose of obviating the aforesaid disadvantages of the prior art. Accordingly, an object of the invention is to provide a control system for hydraulic circuit means capable of making the actuator perform smooth operation which is free from slackness and shock in normal operation and capable of making the actuator act nimbly when it is desired to bring the actuator to a sudden halt in case of emergency, when it is desired to accurately position the load of the actuator, and when it is desired to suddenly reverse the direction of operation of the actuator.

Another object is to provide a control system for hydraulic circuit means capable of making the actuator perform smooth operation which is free from slackness in normal operation in which the operating lever has a large manipulated variable and capable of making the actuator operate without suffering a shock at actuator startup and when a fine operation is performed.

Still another object is to provide a control system for hydraulic circuit means capable of making the actuator operate quickly without causing any shock when it is desired to bring the actuator to a sudden halt in case of emergency, when it is desired to accurately position the load of the actuator, and when it is desired to suddenly reverse the direction of operation of the actuator and capable of readily effecting fine adjustments of the speed of the actuator when the latter is operating at high speed.

According to the invention, there is provided a control system for hydraulic circuit means including a variable displacement hydraulic pump and actuator means driven by said pump, the operating speed of said actuator means being controlled by the position of a displacement volume varying member of said pump, the control system comprising operating means for generating an operating signal for giving a command with regard to the position of said displacement volume varying member of said pump and thus the operating speed of the actuator means, detector means for detecting the actual position of the displacement volume varying member and generating a detector signal indicative of the actual position, and pump control means for controlling the displacement volume varying member based on said operating signal and detector signal while restricting the operating speed of the displacement volume varying member to a level below a predetermined maximum speed, wherein the control system includes a maximum speed setting means previously setting a first predetermined maximum speed and a second predetermined maximum speed higher than the first predetermined maximum speed for the operating speed of the displacement volume varying member, and operative to select the first predetermined maximum speed when the direction of operation of the actuator means commanded by the operating signal is the same as the actual direction of operation thereof and select the second predetermined maximum speed when the position of the displacement volume varying member commanded by the operating signal is in neutral position or when the direction of operation of the actuator means commanded by the operating signal is opposite to the actual direction of operation thereof, whereby the pump control means effects speed control of the displacement volume varying member based on the first or second predetermined maximum speed selected by the maximum speed setting means.

In one preferred embodiment of the invention, the maximum speed setting means may comprise a first means for generating the first predetermined maximum speed, and a second means for generating second predetermined maximum speed, the first and second predetermined maximum speeds each having a constant value.

In another preferred embodiment, the maximum speed setting means may include a first means for generating said first predetermined maximum speed, and a second means for generating the second predetermined maximum speed, the first predetermined maximum speed being in functional relation to the operating signal in such a manner that its value increases as the absolute value of the operating signal increases.

In still another preferred embodiment, the maximum speed setting means may comprise a first means for generating the first predetermined maximum speed, and a second means for generating the second predetermined maximum speed, with the second predetermined maximum speed being in functional relation to the operating signal in such a manner that the absolute value of the second predetermined maximum speed increases as the operating signal changes so as to move the displacement volume varying member from one of its normal and reverse maximum positions toward its neutral position and further increases as the operating signal changes so as to move the displacement volume varying member from near the neutral position toward the other maximum position.

According to the invention, there is also provided a control system for hydraulic circuit means including a variable displacement hydraulic pump, and actuator means driven by the pump. The the operating speed of said actuator means being controlled by the position of a displacement volume varying member of the pump. The control system includes operating means for generating an operating signal for giving a command with regard to the position of the variable displacement varying member of the pump and thus the operating speed of the actuator means. Detector means are provided for detecting an actual position of the displacement volume varying member and generating a detector signal indicative of the actual position, and a pump control means controls the displacement of the volume varying member based on said operating signal and detector signal while restricting the operating speed of the displacement volume varying member to a level below a predetermined maximum speed. The predetermined maximum speed is in a functional relationship to the operating signal in such a manner that its value increases as the absolute value of the operating signal increases.

BRIEF DESCRIPTION OF THE DRAWINGS

FIG. 6 is a graph showing the relation between the operating signal $X_L$ and a predetermined maximum speed $\alpha_1$ set for the predetermined maximum speed generating circuit shown in FIG. 5 and the first predetermined maximum speed generating circuit shown in FIG. 9;

FIGS. 7a and 7b are time charts showing changes occurring in the operating signal and the swash plate position respectively when the operating lever is manipulated to a maximum in the embodiments shown in FIGS. 5 and 9;

FIGS. 8a and 8b are time charts similar to those shown in FIGS. 7a and 7b respectively but showing the changes occurring when the operating lever is manipulated in small amount in the embodiments shown in FIGS. 5 and 9;

FIG. 20 is a flow chart showing the process of operation of the arithmetic control system shown in FIG. 19.

DESCRIPTION OF THE PREFERRED EMBODIMENTS

Figure 1:
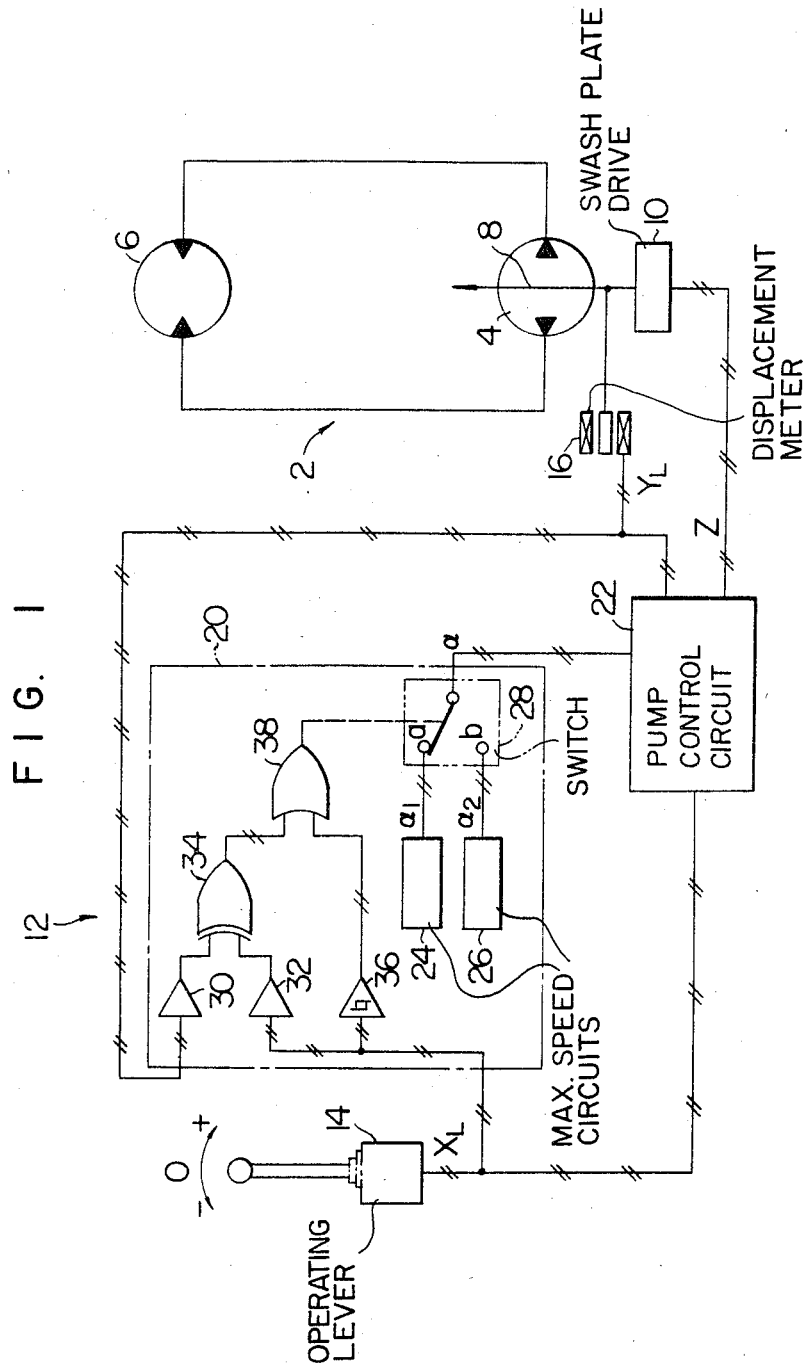
FIG. 1 is a circuit diagram showing a preferred embodiment of the control system for hydraulic circuit means in conformity with the invention.

Referring now to the drawings wherein like reference numerals are used throughout the various views to designate like parts and, more particularly, to FIG. 1, according this figure, hydraulic circuit means generally designated by the reference numeral 2 includes a variable displacement hydraulic pump 4, and a hydraulic motor or actuator 6 driven by the pump 4 connected together in a closed circuit. The pump 4 is a swash-plate pump having a swash plate 8 serving as a displacement volume varying member. The swash plate 8 has its angle or position varied by drive means 10. The pump 4 drives the actuator 6 with a displacement volume corresponding to the position of the swash plate 8. More specifically, the operating speed of the actuator 6 is determined by the position of the swash plate 8 and can be increased or decreased by varying the position of the swash plate 8. Acceleration and deceleration of the actuator 6 is determined by the operating speed of the swash plate 8.

Figure 3:
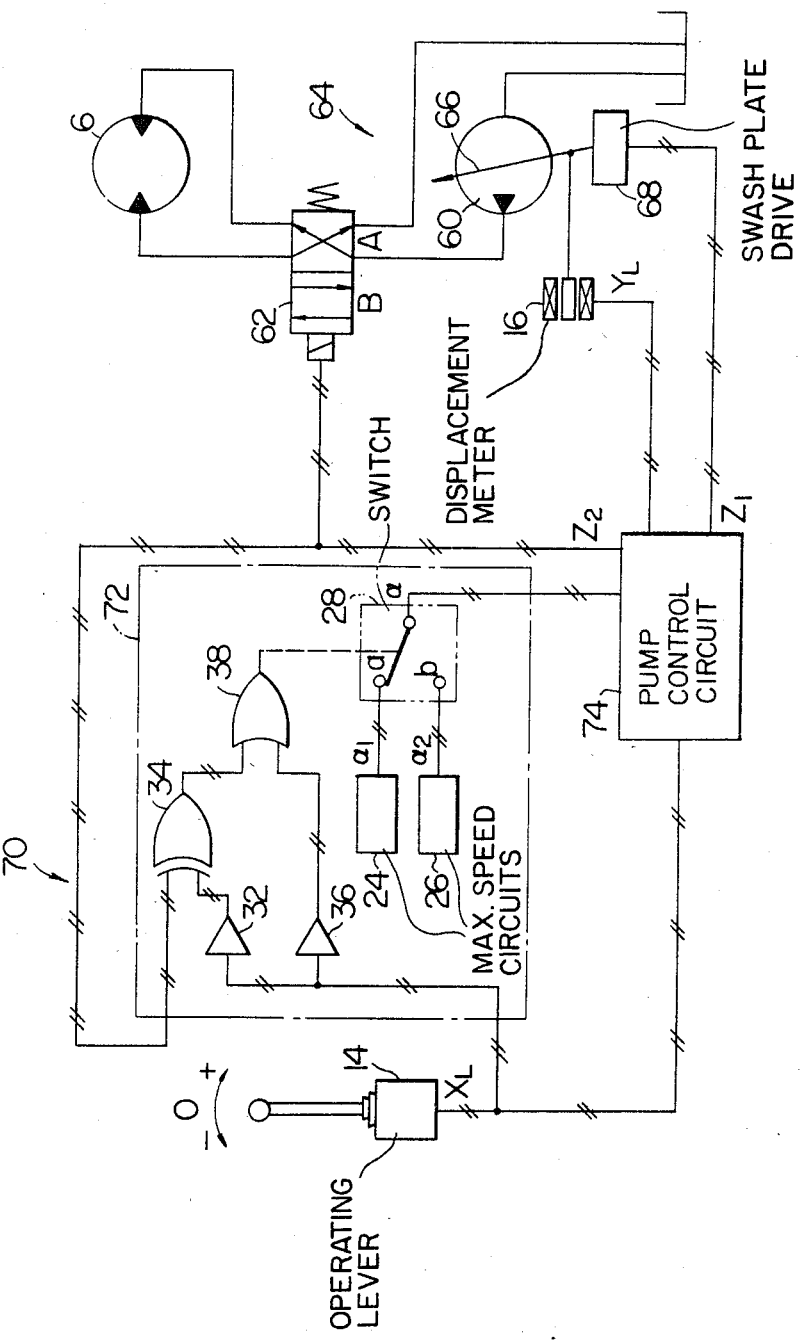
FIG. 3 is a circuit diagram showing an embodiment of the control system according to the invention as applied to hydraulic circuit means of the open circuit type.

The swash plate drive means 10 may be in the form of any servo valve as desired capable of moving the swash plate 8 to a position corresponding to an input signal, or may have a construction shown in FIG. 3 of the International Laid-Open No. WO 81/01031.

In the hydraulic circuit means shown in FIG. 1, accessory parts, such as flushing valves, are omitted in the interest of brevity.

The hydraulic circuit means 2 is controlled by a control system generally designated by the reference numeral 12 comprising one embodiment of the invention. The control system 12 comprises an operating lever 14 serving as operating means for indicating the position of the swash plate 8 and the direction of operation and the operating speed of the actuator 6, a displacement meter 16 for detecting the position of the swash plate 8, a predetermined maximum speed setting circuit 20 for inputting an output signal or operating signal $X_L$ of the operating lever 14 and an output signal or swash plate position signal $Y_L$ of the displacement meter 16 to indicate a maximum value of the operating speed of the swash plate 8, and a pump control circuit 22 for inputting the operating signal $X_L$, swash plate position signal $Y_L$ and an output signal or predetermined maximum speed signal $\alpha$ and generating an output signal Z for actuating the drive means 10.

The predetermined maximum speed setting circuit 20 comprises a first predetermined maximum speed generating circuit 24 having a first predetermined maximum speed $\alpha_1$ set beforehand with respect to the operating speed of the swash plate 8, and a second predetermined maximum speed generating circuit 26 having a second predetermined maximum speed $\alpha_2$ set beforehand with respect to the operating speed of the swash plate 8, the second predetermined maximum speed $\alpha_2$ being higher than the first predetermined maximum speed $\alpha_1$. The first predetermined maximum speed $\alpha_1$ shows the value of an operating speed of the swash plate 8 capable of making the actuator 6 perform a smooth operation free from slackness and shock in normal operation of the swash plate 8 when the manipulated variable of the operating lever 14 is large. The second predetermined maximum speed $\alpha_2$ shows the value of an operating speed of the swash plate 8 capable of making the actuator 6 act nimbly when it is desired to bring it to a halt in case of emergency, when it is desired to accurately position the load of the actuator 6, and when it is desired to rapidly reverse the direction of operation of the actuator 6.

The two predetermined maximum speed generating circuits 24 and 26 are connected to a switch 28 so that one of them can be selected. Comparators 30 and 32 judge whether the operating signal $X_L$ from the operating lever 14 and the detector signal $Y_L$ from the displacement meter 16 are positive or negative, respectively, and produce a high-level signal "1" when the signals $X_L$ and $Y_L$ are positive and a low-level signal "0" when they are negative, respectively. The positive operating signal $X_L$ and detector signal $Y_L$ mean the operation of the actuator 6 in one direction, and the negative signals $X_L$ and $Y_L$ means the operation of the actuator 6 in the other direction. The comparators 30 and 32 may generate either "1" or "0" when the input is zero. An exclusive OR OR EXOR circuit 34 produces "0" when the two inputs are the same with each other and produces "1" when they are not the same with each other. A window comparator 36 produces "1" when the input is zero or in the vicinity of zero and produces "0" when the input has the other value. An OR circuit 38 brings the switch 28 into contact with a contact a by its output "0" and into contact with a contact b by its output "1". The range of inputs in the vicinity of zero which renders the output of the window comparator 36 "1" is made to agree with the dead zone set in the pump control circuit 22. The dead zone is intended to avoid inadvertent movement of the variable displacement hydraulic pump 4 which might be caused by a slight movement of the operating lever 14 located in its neutral position.

Figure 2:
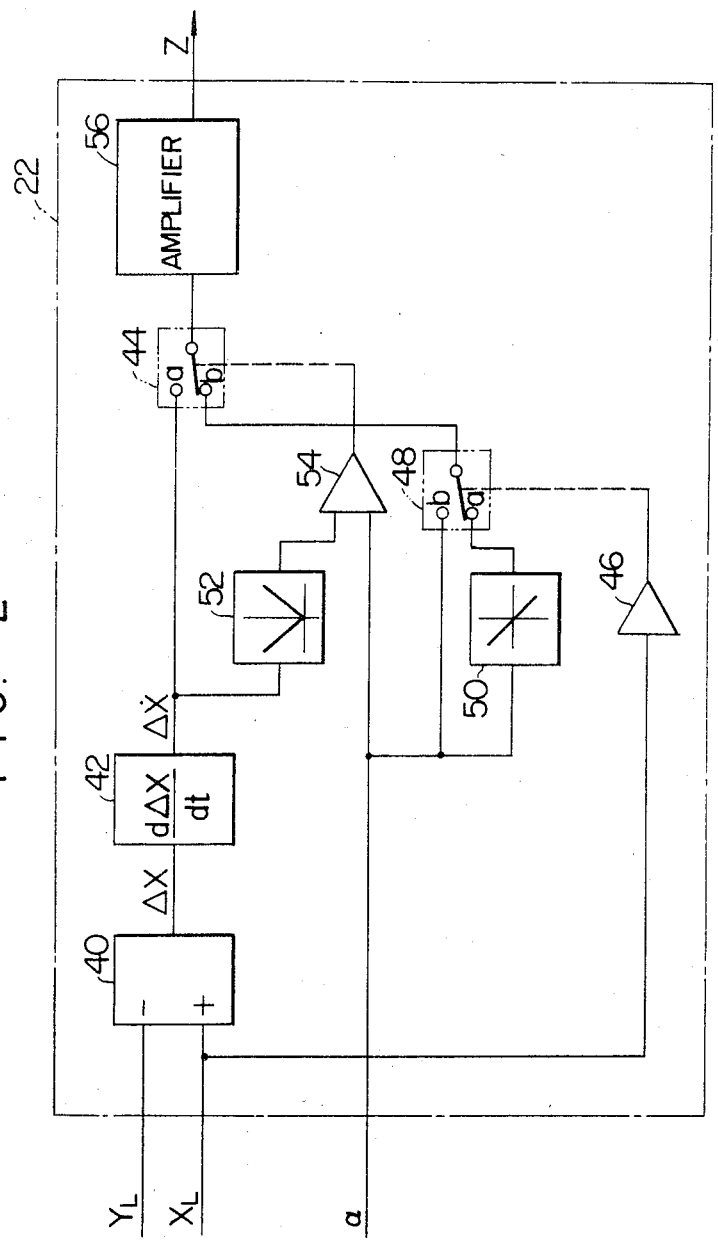
FIG. 2 is a circuit diagram showing in detail the pump control circuit of the control system shown in FIG. 1.

As shown in FIG. 2, the pump control circuit means 22 comprises an adder 40 deducting the swash plate position signal $Y_L$ from the operating signal $X_L$, and a differentiator 42 differentiating a deviation signal $\Delta X$ which is an output of the adder 40 and converting same into a changing rate $\Delta \dot{X}$ of the signal $\Delta X$ with respect to time. The changing rate $\Delta \dot{X}$ is inputted to a contact a of a switch 44. The means 22 also comprises a comparator 46 which judges whether the operating signal $X_L$ is positive or negative. When $X_L \geq 0$, the comparator 46 provides a high-level signal "1" to bring a switch 48 into contact with a contact b to allow a predetermined maximum speed $\alpha$ inputted to the contact b to be supplied to a contact b of the switch 44; when $X_L < 0$, the comparator 46 provides a low-level signal "0" to bring the switch 48 into contact a to allow a predetermined minimum speed $\bar{\alpha}$, which has been changed into a negative value by an inverter circuit 50, to be supplied to the contact b of the switch 44 from the contact a of the switch 48. The pump control circuit means 22 also comprises an absolute value circuit 52 for setting an absolute value $|\Delta \dot{X}|$ of the output $\Delta \dot{X}$ of the differentiator 42, and a comparator 54 operative to judge which is greater $|\Delta \dot{X}|$ or $\alpha$, and to provide an output "0" when $|\Delta \dot{X}| \geq \alpha$ to bring the switch 44 into contact with the contact b to supply $\alpha$ or $\bar{\alpha}$ to an amplifier 56 and to provide an output "1" when $|\Delta \dot{X}| < \alpha$ to bring the switch 44 into contact with the contact a to supply $\Delta \dot{X}$ to the amplifier 56. The signal Z amplified by the amplifier 56 is supplied to the swash plate drive means 10.

Thus, the pump control circuit means 22 is operative to compare the operating signal $X_L$ with the swash plate position signal $Y_L$ and absolute value $|\Delta \dot{X}|$ of the changing rate of the operating signal $X_L$ with the predetermined maximum speed $\alpha$ and provides the signal Z as an output for moving the swash plate 8 to a position commensurate with the operating signal $X_L$ at the speed $\Delta \dot{X}$ when $|\Delta \dot{X}| < \alpha$ and provides the signal Z as an output for moving the swash plate 8 to the position commensurate with the operating signal $X_L$ at the speed $\alpha$ when $|\Delta \dot{X}| \geq \alpha$. Accordingly, the swash plate 8 is moved to the position indicated by the operating signal $X_L$ while the operating speed is restricted to a level below the predetermined maximum speed $\alpha$.

Operation of the control system 12 of the aforesaid construction will now be described.

If the operating lever 14 is moved to a positive side when the actuator 6 is inoperative, then the pump control circuit means 22 supplies a signal Z to the drive means 10 to move the position of the swash plate 8 from a neutral position to one side toward the normal maximum position. At this time, the operating signal $X_L$ from the operating lever 14 and the detector signal $Y_L$ from the displacement meter 16 both become positive, and therefore the outputs of the comparators 30 and 32 both become "1" and the output of the EXOR circuit becomes 34 becomes "0". The operating signal $X_L$ is not in the vicinity of zero, so that the output of the window comparator 36 is rendered "0". Thus, the output of the OR circuit 38 is rendered "0", thereby bringing the switch 28 into contact with the contact a. Thus, the first predetermined maximum speed $\alpha_1$ is selected and inputted to the pump control circuit means 22. In this way, the pump control circuit means 22 effects control to bring the operating speed of the swash plate 8 into agreement with the first predetermined maximum speed $\alpha_1$ when an abrupt manipulation of the operating lever 14 causes the increasing rate of the position command value of the operating signal $X_L$ to exceed the first predetermined maximum speed $\alpha_1$. Thus, acceleration of the actuator 6 is restricted to a level below a predetermined value corresponding to the first predetermined maximum speed $\alpha_1$.

In the case that the operating signal $X_L$ of the operating lever 14 and the detector signal $Y_L$ of the displacement meter 16 both become negative, the output of OR circuit 38 becomes "0", thereby also selecting the first predetermined maximum value $\alpha_1$. Thus, pump control circuit means 22 effects control while restricting the operating speed of the swash plate 8 to a level below the first predetermined maximum speed $\alpha_1$.

If the operating lever 14 is returned to the neutral position to suddenly bring the actuator 6 to a halt, then the output of window-comparator 36 becomes "1", so that the switch 28 is brought into contact with the contact b and the second predetermined maximum speed $\alpha_2$ is selected. As a result, the operating speed of the swash plate 8 is restricted to a level below the second predetermined maximum speed $\alpha_2$ and the limit placed on the acceleration of the actuator 6 becomes higher than when the first predetermined maximum speed $\alpha_1$ is selected. Thus, it is possible to bring the actuator 6 to a sudden halt by greatly accelerating same.

When it is desired to change the direction of operation of the actuator from one direction to the other direction, if the operating lever 14 is instantaneously switched from the positive side to the negative side, for example, a change in the position of the swash plate 8 takes place with a time lag behind the position comman value given by the operating lever 14 because the operating speed thereof is restricted by the pump control circuit means 22. Thus, the operating signal $X_L$ of the operating lever 14 becomes negative while the detector signal $Y_L$ of the displacement meter 16 remains positive. This renders the outputs of comparators 30 and 32 and EXOR circuit 34 "1", "0" and "1" respectively, so that the switch 28 is brought into contact with the contact b and the second predetermined maximum speed $\alpha_2$ is selected. Thus, the limit placed on the operating speed of the swash plate 8 is increased and the actuator 6 is greatly decelerated. As the actual position of the swash plate 8 becomes negative, the output of comparator 30 becomes "0" and the output of EXOR circuit 34 also becomes "0", thereby selecting the first predetermined maximum speed $\alpha_1$.

When it is desired to precisely position the load of the actuator 6, the second predetermined maximum speed $\alpha_2$ is selected by suddenly returning the operating lever 14 to a neutral position in the same manner as the actuator 6 is brought to a halt in case of emergency. Thus, the actuator 6 can be quickly stopped at a desired position by greatly decelerating same.

In the embodiment of FIG. 3, a hydraulic circuit means 64 includes a variable displacement hydraulic pump 60 and the actuator 6 connected together in an open circuit through a directional control valve 62. The variable displacement hydraulic pump 60 has a swash plate 66 which is of a single direction tilting type for delivering hydraulic fluid in one direction only. Switching of the actuator 6 from one direction of operation to another is effected by the directional control valve 62. In this circuit means, the operating speed and acceleration of the actuator 6 are also restricted by varying the position and operating speed of the swash plate 66 which is actuated by drive means 68 of substantially the same construction as the swash plate drive means 10 of the embodiment shown in FIG. 1.

A control system generally designated by the reference numeral 70 comprises a predetermined maximum speed setting circuit 72 and a pump and valve control circuit 74. The pump and valve control circuit 74 which is of the construction later described inputs the output signals $X_L$, $Y_L$ and $\alpha$ of the operating lever 14, displacement meter 16 and predetermined maximum speed setting circuit 72, respectively, and is operative to provide a swash plate control signal $Z_1$ and a valve control signal $Z_2$ to the drive means 68 and directional control valve 52, respectively. The valve control signal $Z_2$ is "1" or "0", and the directional control valve 62 is moved to a position B when $Z_2$ is "1" and to a position A when $Z_2$ is "0". The valve control signal $Z_2$ is supplied to the predetermined maximum speed setting circuit 72 in place of the swash plate position signal $Y_L$ in the embodiment shown in FIG. 1, and the signal $Z_2$ is directly inputted to the EXOR circuit 34. Thus, the maximum speed setting circuit 72 has no comparator 30 shown in FIG. 1.

Figure 4:
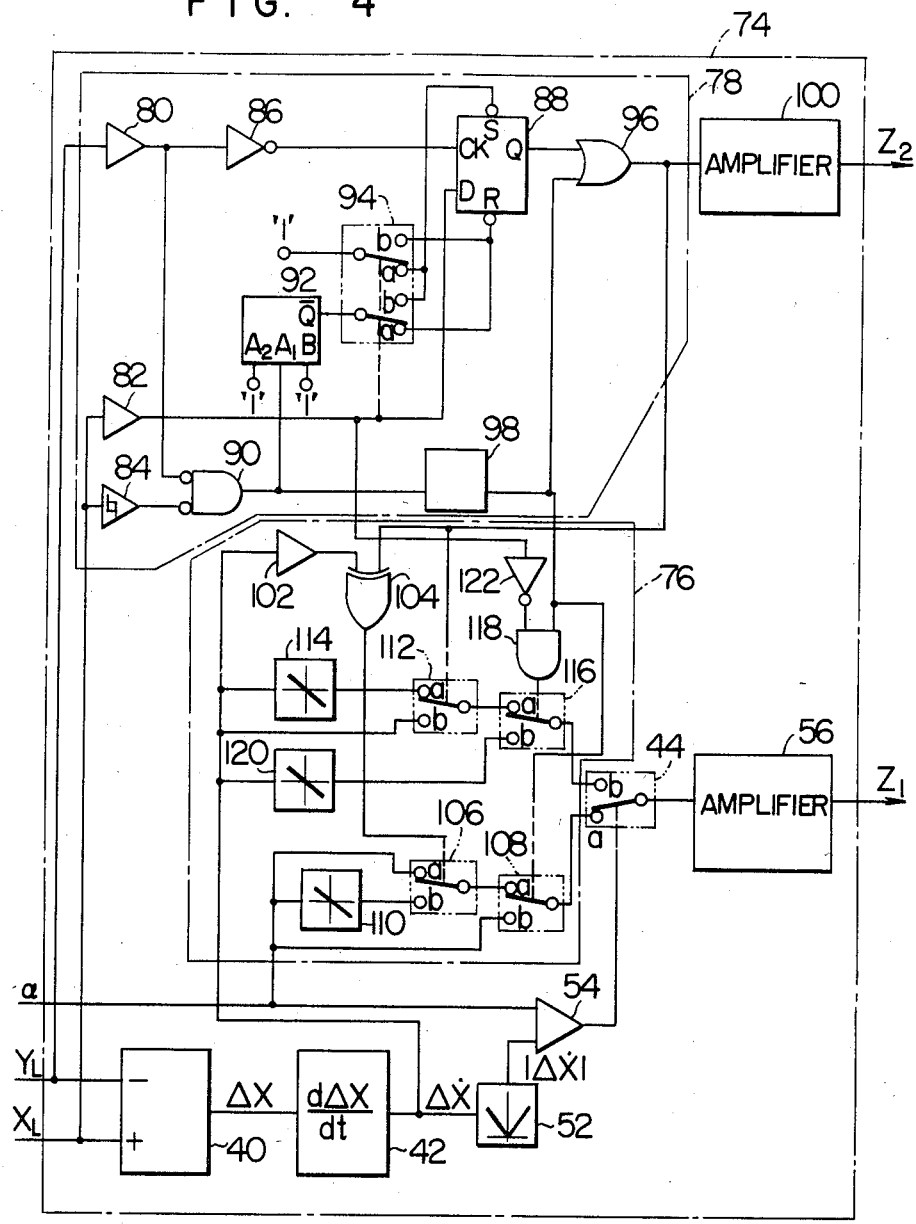
FIG. 4 is a circuit diagram showing in detail the pump and valve control circuit of the control system shown in FIG. 3.

The pump and valve control circuit 74 is shown in FIG. 4 in which the circuit 74 comprises, like the circuit 22 of the first embodiment shown in FIG. 2, the adder 40, differentiator 42, absolute value circuit 52 comparator 54, switch 44 and amplifier 56 and compares the absolute value $|\Delta \mathring{X}|$ of the changing rate of the operating signal $X_L$ with the predetermined maximum speed $\alpha$ to select a value on the basis of $\Delta \mathring{X}$ or $\alpha$ depending on which of the two is larger. The switch 44 is, however, brought into contact with a contact a when the output of comparator 54 is "0" and with a contact b when it is "1". The control circuit 74 comprises a swash plate driving direction control circuit section 76 and a valve control circuit section 78.

In the valve control circuit section 78, a comparator 80 provides a low-level signal "0" when the swash plate position signal $Y_L$ is zero or in the vicinity of zero and otherwise provides a high-level signal "1". A comparator 82 provides "1" when the operating signal $X_L$ is positive and provides "0" when it is zero or negative. A window comparator 84 provides "0" when the operating signal is zero or in the vicinity of zero and otherwise provides "1". The output of comparator 80 is inverted by a NOT circuit 86 and inputted to a CK terminal of a D fli-flop 88. The output of comparator 82 is inputted to a D terminal of the D flip-flop 88. A NOR circuit 90 provides "1" only when the outputs of comparator 80 and window comparator 84 are both "0". The output of NOR circuit 90 is inputted to an $A_1$ terminal of a monostable multivibrator 92 which provides a "0" pulse for a predetermined period of time from a $\overline{Q}$ terminal when the inputs to $A_2$ and B terminals are both "1" and the input to the $A_1$ terminal changes from "1" to "0". A switch 94 is brought into contact with a contact a when the output of comparator 82 is "0", and the signal "1" is supplied to an S terminal of the D flip-flop 88 and the output of monostable multivibrator is supplied to an R terminal of the D flip-flop 88. The switch 94 is brought into contact with a contact b when the output of comparator 82 is "1", and the signals supplied to the S and R terminals of the D flip-flop 88 are reversed. The D flip-flop 88 provides from a Q terminal the same signal "1" or "0" as the input to the D terminal when the S and R terminals both have inputs "1" and the input to the CK terminal rises from "0" to "1", and provides the same signal "1" as the input to the R terminal when the input to the S terminal is "0" and the input to the R terminal is "1" and the same signal "0" as the input to the R terminal when the input to the S terminal is "1" and the input to the R terminal is "0". An OR circuit 96 provides "0" only when the output of D flip-flop 88 and the output of NOR circuit 90 supplied thereto via a delay circuit 98 are both "0". The output of OR circuit 96 is supplied as the valve control signal $Z_2$ through an amplifier 100.

In the swash plate driving direction control circuit section 76, a comparator 102 provides "1" when the changing rate $\Delta \mathring{X}$ of the deviation signal $\Delta X$ is zero or positive and provides "0" when it is negative. The output of comparator 102 is supplied, together with the output of OR circuit 96, to an EXOR circuit 104. A switch 106 is in contact with a contact a when the output of EXOR circuit 104 is "0" and the predetermined maximum speed signal $\alpha$ is supplied to a contact a of a switch 108, and brought into contact with a contact b when the output of EXOR circuit 104 is "1" and the signal $\alpha$ is supplied to the contact a of switch 108 after rendering same negative by an inverting circuit 110. The switch 108 is positioned in engagement with the contact a when the output of delay circuit 98 is "0", and brought into contact with a contact b through which the signal $\alpha$ is supplied when the output of delay circuit 98 is "1". A switch 112 is positioned in engagement with a contact a when the output of OR circuit 96 is "0" and supplies the changing rate $\Delta \mathring{X}$ to a contact a of a switch 116 by inverting same by an inverting circuit 114, and brought into contact with a contact b when the output of OR circuit 96 is "1" and the changing rate $\Delta \mathring{X}$ is supplied to the contact a of the switch 116 as it is. The switch 116 is in contact with the contact a when the output of an AND circuit 118 is "0", and brought into contact with a contact b through which the changing rate $\Delta \mathring{X}$ is supplied after being inverted by an inverting circuit 120 when the output of AND circuit 118 is "1". The AND circuit 118 is inputted thereto the output of comparator 82 which is inverted by a NOT circuit 122 and the output of delay circuit 98, and provides "1" only when the outputs of comparator 82 and delay circuit 98 are both "1".

Operation of the embodiment shown in FIG. 3 will be described. In normal operation in which the direction of operation of the actuator 6 commanded by the operating lever 14 is the same as the actual direction of operation, the pump and valve control circuit 74 provides a signal $Z_2$ of "1" or "0" due to the aforesaid construction, so that the two inputs $X_L$ and $Z_2$ to the EXOR circuit 34 are both "1" or "0" and their outputs are "0". The output of window comparator 36 is also "0". Thus, the output of OR circuit 38 is "0" and the switch 28 is brought into contact with the contact a to select the first predetermined maximum speed $\alpha_1$. Thus, the operating speed of the swash plate 66 is restricted to a level below the first predetermined maximum speed $\alpha_1$ and acceleration of the actuator 6 is kept to a level below a predetermined value corresponding to the first predetermined maximum speed $\alpha_1$.

When it is desired to bring the actuator 6 to a sudden halt in case of emergency or to precisely position the load of the actuator 6, the operating lever 14 is suddenly returned to its neutral position and the input to the window comparator 36 becomes near zero, so that its output becomes "1" and the second predetermined maximum speed is selected. The limit placed on the operating speed of the swash plate 66 is increased and enables the swash plate 66 to be restored to the neutral position at a high speed, thereby suddenly decelerating the actuator 6 and bringing same to a halt.

If the operating lever 14 is suddenly moved from the positive side to the negative side, the output of the comparator 32 becomes "0". Meanwhile, if the directional control valve 62 were actuated depending only on the positivity or negativity of the operating signal from the operating lever 14, a great shock would occur because of a sudden reversal of the flow of hydraulic fluid. To avoid this phenomenon, pump and valve control circuit 74 is adapted, due to the aforesaid construction, to actuate the directional control valve 62 when the swash plate 66 is actually restored to the neutral position. That is, the signal $Z_2$ supplied from the control circuit 74 to the directional control valve 62 and EXOR circuit 34 remains "1" until the swash plate 66 returns to the neutral position, so that the second predetermined maximum speed $\alpha_2$ is selected and the swash plate 66 is restored to the neutral position at a high speed. As soon as the swash plate 66 returns to the neutral position, the output signal $Z_2$ of the control circuit 74 becomes "0" to bring the directional control valve 62 to position A. The two inputs $X_L$ and $Z_2$ to the EXOR circuit 34 become "0", thereby selecting the first predetermined maximum speed $\alpha_1$ again.

In the embodiments shown in FIGS. 1 and 3, the operating lever 14 has been described as being used as operating means. However, the invention is not limited to this specific form of operating means and master means may be used as operating means when an working element is made to act as a slave by following up the operation of the master means.

The predetermined maximum speed setting circuit 20, 72 and control circuit 22, 74 are each in the form of an electronic circuit as described hereinabove and shown in the drawings. However, they may be in the form of a microcomputer or hydraulic equipment. Also, the circuit 20, 72 and the circuit 22, 74 may be combined into a single microcomputer.

As described hereinabove, according to the invention, the operating speed of the displacement volume varying member of the variable displacement hydraulic pump is restricted to a level below the first predetermined maximum speed in normal operation in which the direction of operation of the actuator commanded by an operating signal agrees with the actual direction of operation thereof. Thus, it is possible to keep acceleration of the predetermined value thereby to cause the actuator to perform shockless smooth operation. Also, when the displacement volume varying member is returned to the neutral position by an operating signal in case of emergency and positioning of the load of the actuator and when the direction of operation of the actuator is reversed from the actual direction of operation thereof, the second predetermined maximum speed higher than the first predetermined maximum speed is selected to allow the actuator to operate quickly. Thus, it is possible to conduct sudden stopping of operation of the actuator in case of emergency and accurate positioning of the load of the actuator and to effect quick reversing of the direction of operation of the actuator.

Figure 5:
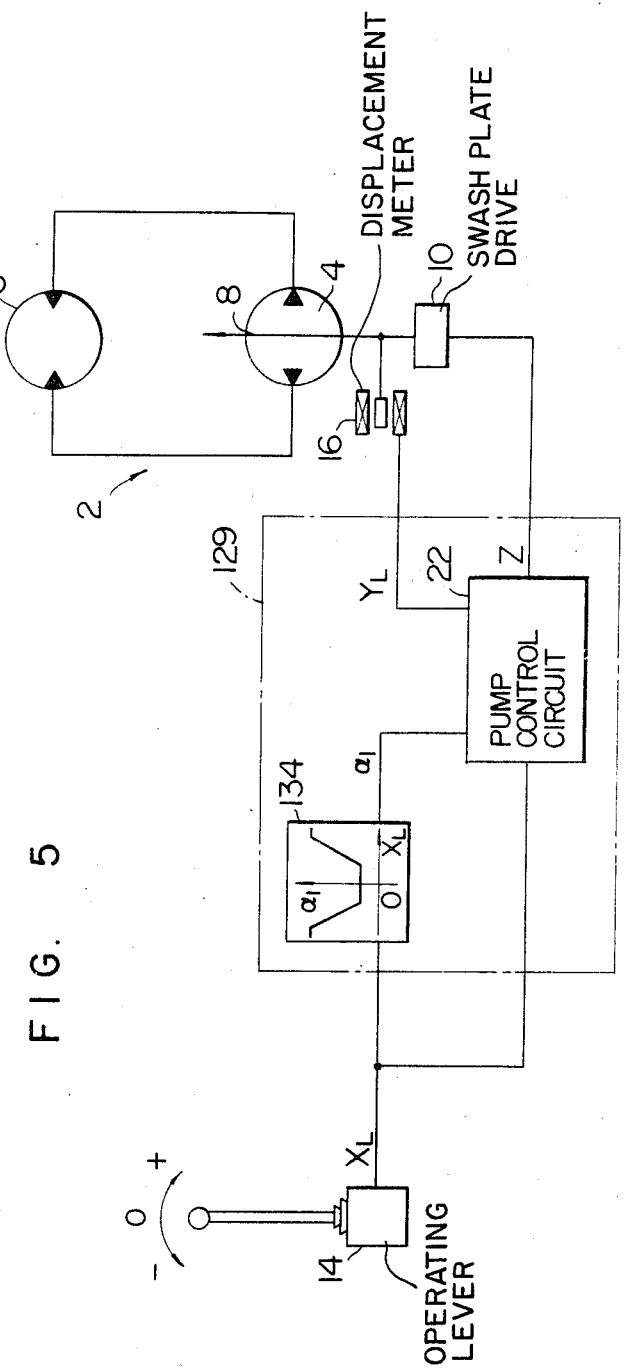
FIG. 5 is a circuit diagram showing a third embodiment of the control system for hydraulic circuit means in conformity with the invention.

As shown in FIG. 5, a control system 129 has a predetermined maximum speed generating circuit 134 in which a first predetermined maximum speed $\alpha_1$ as shown in FIG. 6, for example, is set beforehand as a function of the operating signal $X_L$. More specifically, the circuit 134 provides $\alpha_{1\ min}$ as a predetermined maximum speed when the absolute value of the operating signal $X_L$ is below $X_{L1}$ as indicated by $X_{L1} = \frac{1}{4} X_{L\ max}$, provides $\alpha$ which is obtained by adding to $\alpha_{1\ min}$ a value increasing in proportion to the absolute value of the operating signal $X_L$ when the absolute value of the operating signal $X_L$ exceeds $X_{L1}$, and provides $\alpha_{1\ max}$ when the absolute value of the operating signal $X_L$ is below a predetermined value near $X_{L\ max}$. The value of $\alpha_{1\ max}$ is substantially equal to the value of $\alpha_1$ set for the circuit 24 of the embodiment shown in FIG. 1. $X_{L1} = \frac{1}{4} X_{L\ max}$ is one example, and $X_{L1}$ is not limited to this value.

Operation of the control system 139 will be described. When the operating lever 14 is manipulated suddenly from the neutral position to the positive side to a maximum, the operating signal $X_L$ suddenly increases to $X_L$ max as shown in FIG. 7a. At this time, when the operating signal $X_L$ is in a range of low values, the maximum speed signal $\alpha_{1\ min}$ of a low value is provided as an output, and as the operating signal $X_L$ increases in value, $\alpha_1$ which becomes larger in proportion to the increase in $X_L$ is provided, and $\alpha_{1\ max}$ of a maximum value is provided when $X_L$ is maximized or near the maximum value. Thus, as shown in FIG. 7b, the tilting speed of the swash plate 8 is reduced and acceleration of the actuator 6 is also reduced at the initial stage of operation, so that the shock suffered at actuator startup can be minimized. The tilting speed of the swash plate 8 gradually increases thereafter, and acceleration of the actuator 6 also gradually increases. This avoids slackening of the operation of the actuator 6.

When the operating lever 14 is suddenly moved from the neutral position to the positive side for $\frac{1}{4}$ of the maximum manipulated variable $X_{L\ max}$ to effect fine operation, the operating signal $X_L$ quickly increases to $X_{L1}$ but $\alpha_{1\ min}$ is provided as a maximum speed signal $\alpha_1$ as shown in FIG. 8a. Thus, the tilting speed of the swash plate 8 is low as shown in FIG. 8b and acceleration of the actuator 6 is small, so that no shock that would influence the fine operation is produced.

Figure 9:
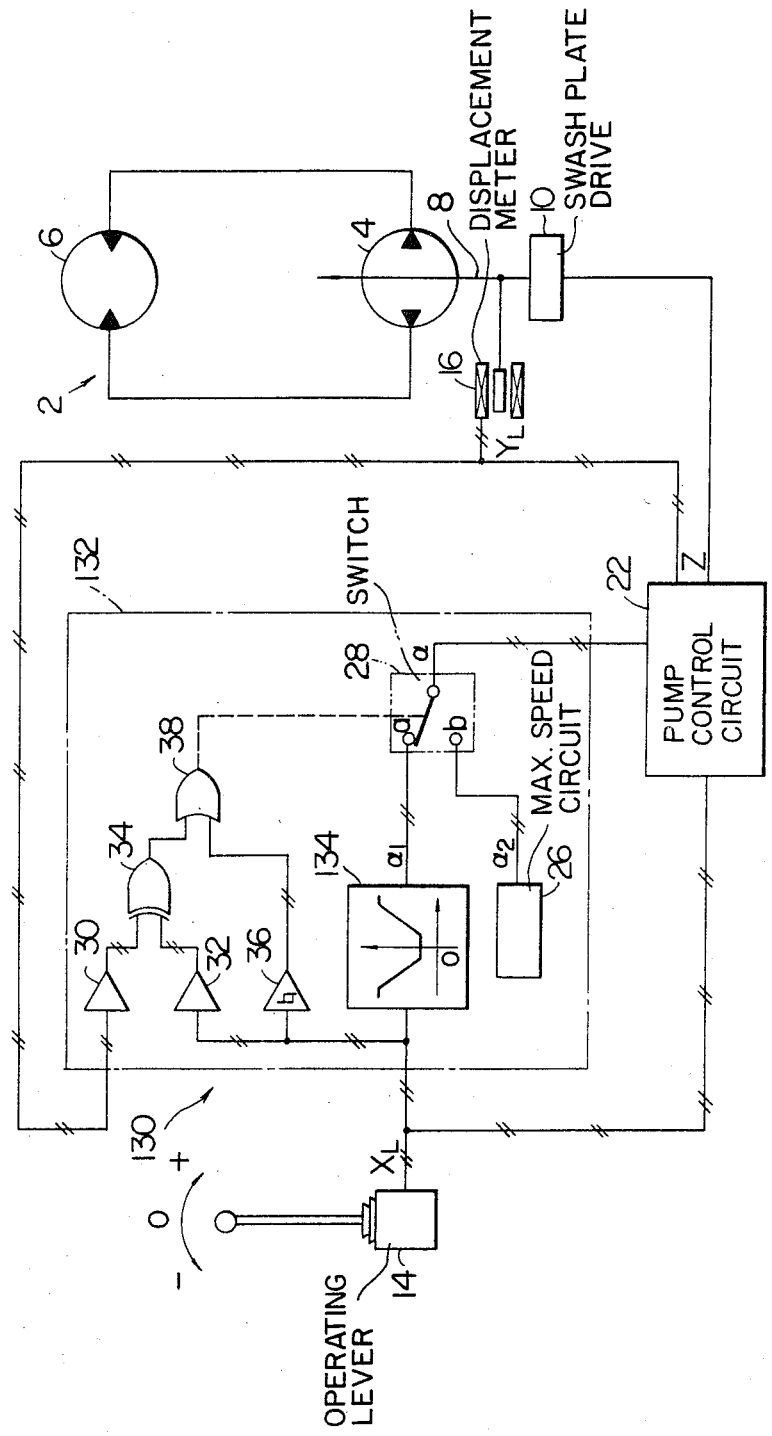
FIG. 9 is a circuit diagram showing a fourth embodiment of the control system for hydraulic circuit means in conformity with the invention.

As shown in FIG. 9, control system generally designated by the numeral 130 is similar to that of the embodiment shown in FIG. 1 except that the predetermined maximum speed generating circuit 134 used in the third embodiment shown in FIG. 5 is used in place of the first predetermined maximum speed generating circuit 24 in a maximum speed setting circuit 132.

In operation of the embodiment shown in FIG. 9, the predetermined maximum speed generating circuit 134 shown in FIG. 5 is selected in place of the first predetermined maximum speed generating circuit 24 in the embodiment shown in FIG. 1, and the predetermined maximum speed $\alpha_1$ of the circuit 134 is provided as an output to the pump control circuit 22. In other respects, the control system 130 operates in the same manner as the control system of the embodiment shown in FIG. 1.

Figure 10:
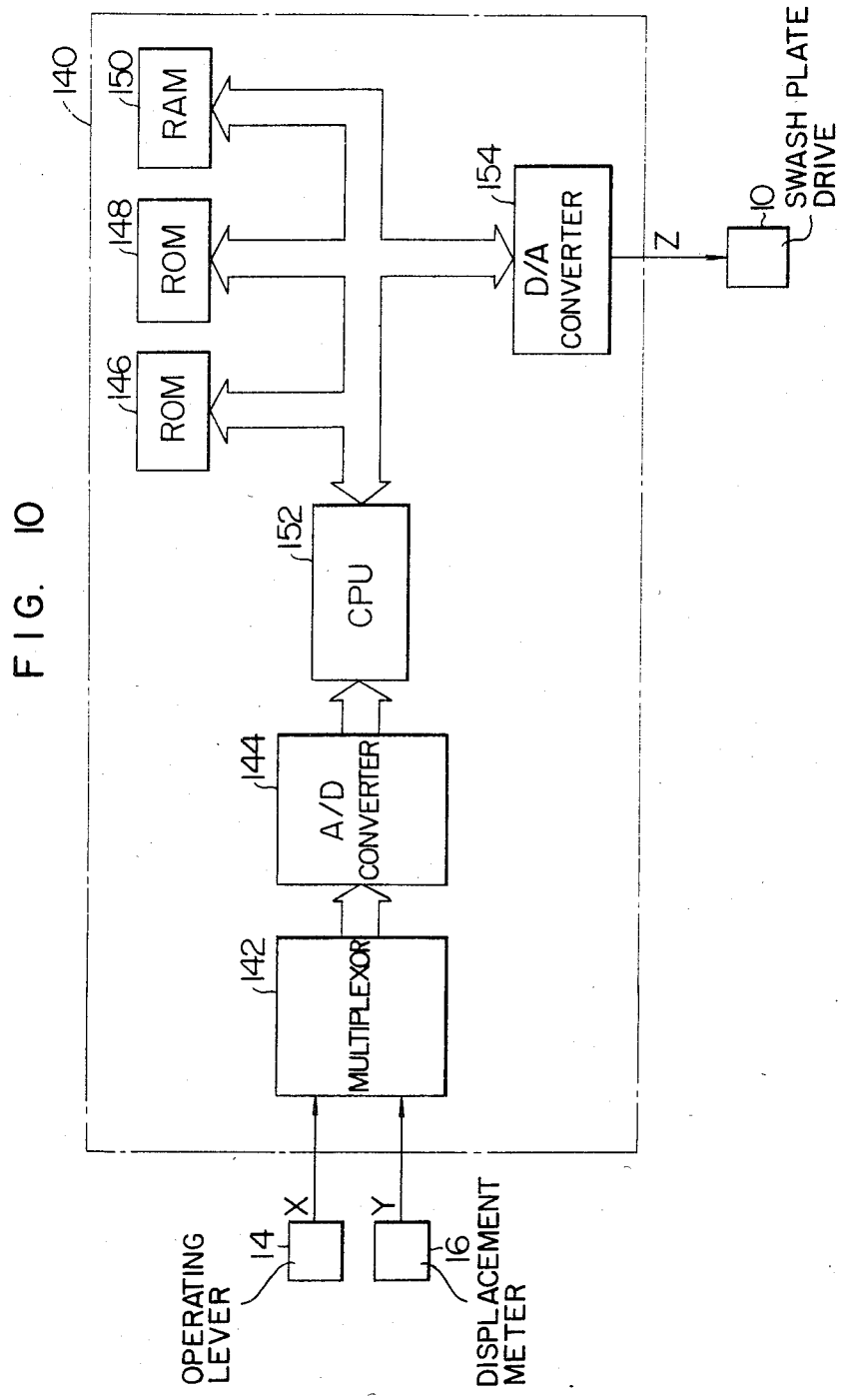
FIG. 10 is a block diagram showing an arithmetic control system in which the embodiment shown in FIG. 9 is carried out by using a microcomputer.

In the embodiment shown in FIG. 9, circuits 22 and 132 are each in the form of an electronic circuit. However, they may be formed into a single microcomputer. FIG. 10 shows an example of computerization of the circuits, in which an arithmetic control means generally designated by the numeral 140 corresponds to the circuits 22 and 132.

The arithmetic control means 140 comprises a multiplexor 142 providing the operating signal $X_L$ and swash plate position signal $Y_L$ by switching them, an A/D converter 144 for converting the operating signal $X_L$ and swash plate position signal $Y_L$ which are analog signals into digital signals, an ROM memory 146 storing the operation process, an ROM memory 148 storing a table of $X_L$ and $\alpha_1$ corresponding to the functions shown in FIG. 6 and storing $\alpha_2$ corresponding to the value set in the circuit 26 shown in FIG. 9, an ROM memory 150 temporarily storing the operating signal $X_L$ and swash plate position signal $Y_L$ supplied from the A/D converter 144 and the numerical values in the process of calculation, a central processing unit or CPU 152 doing calculation in accordance with the operation process stored in ROM memory 146, and a D/A converter 154 converting a digital signal from the CPU 152 into an analog signal and supplying same to the swash plate drive means 10.

Operation of the arithmetic control means 140 will be described in accordance with the flow chart of FIG. 11.

As the operating lever 14 is moved from the neutral position to the positive side, the operating signal $X_L$ and swash plate position signal $Y_L$ are both positive and the former is greater than the latter. Thus, steps a-1, a-2, a-3, a-4, a-5, a-8, a-9, a-10, a-11 and a-14 are followed. More specifically, in step a-5, $\alpha_1$ corresponding to the operating signal $X_L$ is read from ROM memory 148 as a predetermined maximum speed $\alpha$, and the swash plate drive means 10 is controlled so that tilting of the swash plate 8 will be carried out at a speed below the predetermined maximum speed $\alpha_1$. At this time, $\alpha_1$ may be of any value from $\alpha_{1\ min}$ to $\alpha_{1\ max}$ in accordance with an increase in $X_L$. Thus, even if the operating lever 14 is suddenly moved from the neutral position to a maximum, a shock suffered at actuator startup is small and no slackening of actuator operation ensues.

When the operating lever 14 is moved from the neutral position for $\frac{1}{4}$ the maximum manipulated variable $X_{L\ max}$ to effect fine operation, the $\alpha_1$ read from in step a-5 is $\alpha_{1\ min}$, so that acceleration of the actuator 6 is reduced and a shock is minimized.

When the position of the swash plate 8 has a value corresponding to the manipulated variable of the operating lever 14 or when the operating signal $X_L$ and swash plate position signal $Y_L$ become equal to each other, steps a-1, a-2, a-3, a-4, a-5, a-8, a-13 and a-14 are followed to control the swash plate drive means 10 in a manner to cause the swash plate 8 to become stationary in this position. If the operating lever 14 is returned to the neutral position or moved to the negative side, then the operating signal $X_L$ becomes zero or below zero and the operating signal $X_L$ becomes smaller than the swash plate signal $Y_L$, so that steps a-1, a-2, a-3, a-4, a-7, a-8, a-9, a-10, a-11 and a-14 are followed. More specifically, in step a-7, $\alpha_2$ is read from ROM memory 148 as a predetermined maximum speed signal $\alpha$ and the swash plate drive means 10 is controlled in such a manner that the swash plate 8 is tilted at a speed below the predetermined maximum speed $60_2$. Thus, it is possible to obtain great deceleration of the actuator 6.

In the embodiment shown and described hereinabove, the operating signal $X_L$ is related to the predetermined maximum speed $\alpha_1$ as shown in FIG. 6. However, the predetermined maximum speed $\alpha_1$ may be increased in proportion to the absolute value of the operating signal $X_L$ or in proportion to the square of the operating signal $X_L$. Also, the predetermined maximum speed signal $\alpha_1$ may be increased stepwise as the absolute value of the operating signal $X_L$ increases. Stated differently, the predetermined maximum speed $\alpha_1$ is set such that its value increases as the absolute value of the operating signal $X_L$ increases.

Figure 11:
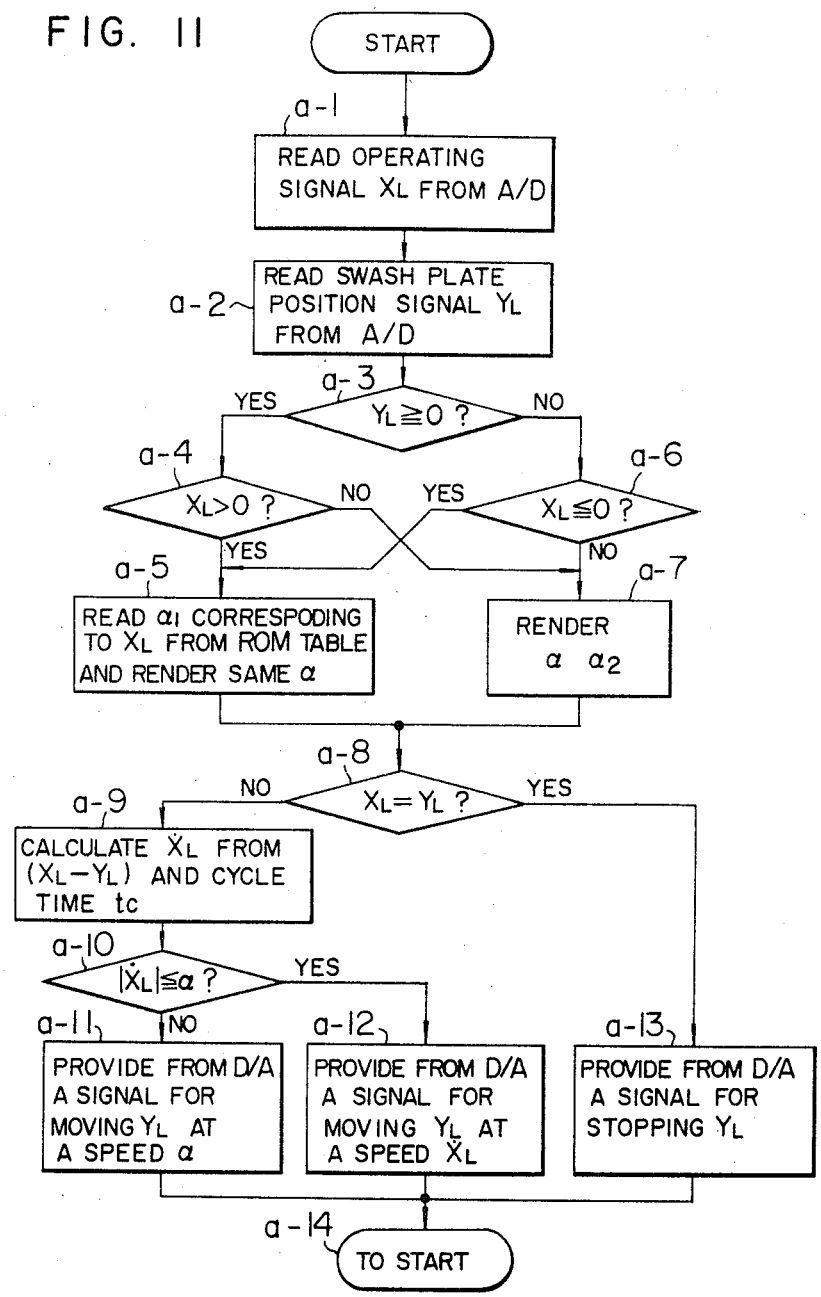
FIG. 11 is a flow chart showing the process of operation performed by using the arithmetic control system shown in FIG. 10.

From the foregoing description, it will be apparent that, like the embodiments shown in FIGS. 1–4, the embodiment shown in FIGS. 9–11 is operative to restrict the operating speed of the displacement volume varying member of the variable displacement hydraulic pump to a level below the first predetermined maximum speed in normal operation in which the manipulated variable of the operating lever is great. Thus, it is possible to keep acceleration of the actuator to a level below a predetermined value and to enable the actuator to perform a shock-free smooth operation. When the operation of the actuator is interrupted in case of emergency, when the load of the actuator is positioned and when the direction of operation of the actuator is reversed, the second predetermined maximum speed higher than the first predetermined maximum speed is selected for the operating speed of the displacement volume varying member, thereby making it possible to increase the speed of operation of the actuator.

An additional advantage offered by the embodiment shown in FIGS. 9–11 is that by virtue of the feature that the value of the first predetermined maximum speed is increased as the absolute value of the operating signal increases, it is possible to obtain a smooth operation of the actuator which is substantially free from shock when the actuator is started or when fine operation thereof is performed.

Although in the fourth embodiment the second predetermined maximum speed generating circuit 26 is used, means for calculating a derivative value $\overset{\circ}{X}_L$ of the operating signal $X_L$ from the operating lever 14 may be used in place of the circuit 26, the derivative value $\overset{\circ}{X}_L$ being supplied to the contact b of the switch 28. With the construction, since the operating lever 14 is usually rapidly moved when it is desired to bring the actuator to a sudden halt in case of emergency, when it is desired to precisely position a load of the actuator, and when it is desired to suddenly reverse the direction of operation of the actuator, it is possible to obtain a command speed similar or higher than the above-mentioned second predetermined maximum speed based on the derivate value $X_L$, thereby making it possible to secure a rapid operation of the actuator.

Figure 12:
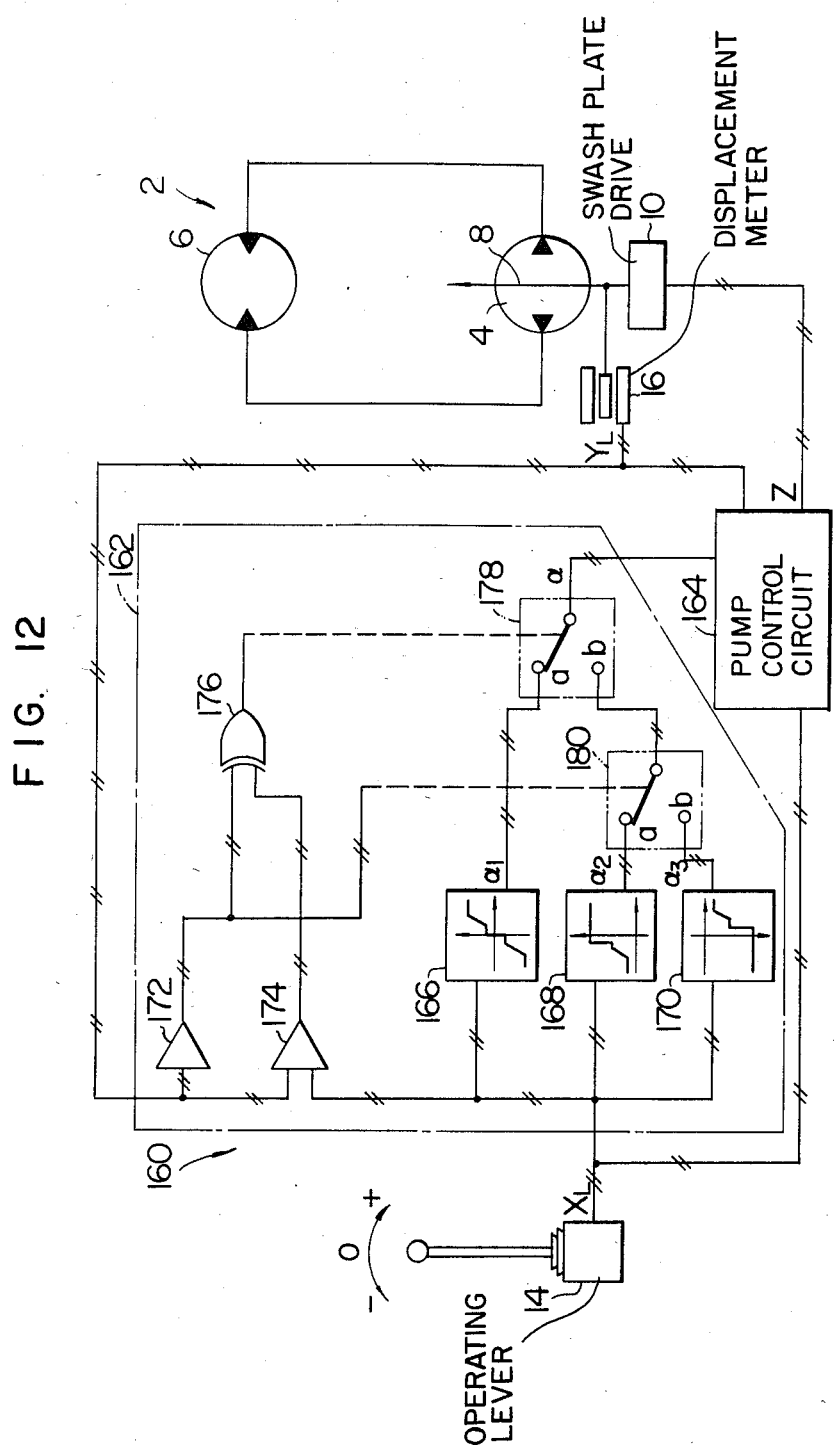
FIG. 12 is a circuit diagram showing a fourth embodiment of the control system for hydraulic circuit means in conformity with the invention.

In FIG. 12, a control system for controlling the hydraulic circuit 2 is generally designated by the numeral 160 and comprises an operating lever 14 serving as operating means for indicating the position of the swash plate 8 and the direction of operation and operating speed of the actuator 6, a displacement meter 16 for detecting the position of the swash plate 8, a maximum speed setting circuit 162 for inputting the output signal or operating signal $X_L$ of the operating lever 14 and the output signal or swash plate position signal $X_L$ of the displacement meter 16 and to indicate a maximum value of the operating speed of the swash plate 8, and a pump control circuit 164 for inputting the operating signal $X_L$, swash plate position signal $Y_L$ and the output signal or maximum speed signal $\alpha$ of the circuit 162 and providing an output signal Z for actuating the drive means 10, as is the case with the embodiment shown in FIG. 1.

The maximum speed setting circuit 162 comprises first, second and third predetermined maximum speed generating circuits 166, 168 and 170 respectively generating first, second and third predetermined maximum speed signals $\alpha_1$, $\alpha_2$ and $\alpha_3$ corresponding to the operating signal $X_L$, a comparator 172 judging the swash plate position signal $Y_L$ and providing a "1" signal when $Y_L \geqq 0$ and providing a signal "0" when $Y_L < 0$, a comparator 174 comparing the swash plate position signal $Y_L$ with the operating signal $X_L$ and providing a "1" signal when $X_L \geq Y_L$ and providing a "0" signal when $X_L < Y_L$, an EXOR circuit 176 providing a "0" signal when the outputs of the comparators 172 and 174 are equal to each other and providing a signal "1" when they are distinct from each other, a switch 178 brought into contact with a contact b when the output of EXOR circuit 176 is "1" and brought into contact with a contact a when it is "0", and a switch 180 brought into contact with a contact b when the output of comparator 172 is "1" and brought into contact with a contact a when it is "0".

Figure 13:
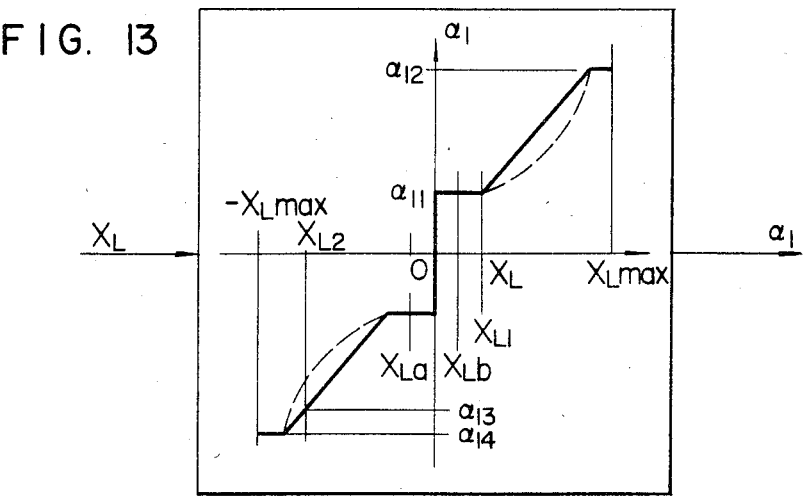
FIGS. 13-15 are graphs showing the relation between the operating signal $X_L$ and predetermined maximum speeds $\alpha_1$, $\alpha_2$ and $\alpha_3$ set for the first, second and third predetermined maximum speed generating circuits respectively shown in the embodiment shown in FIG. 12.

In the first predetermined maximum speed generating circuit 166, the operating signal $X_L$ is related to the first predetermined maximum speed $\alpha_1$ functionally as shown in FIG. 13. That is, when the operating signal $X_L$ is in a positive range, if $X_L$ is less than $X_{L1}$ which is indicated as $X_{L1} = \frac{1}{4} X_{L\ max}$, then $\alpha_1$ has a minimum value $\alpha_{11}$, if $X_L$ exceeds $X_{L1}$, then $\alpha_1$ has a value which is $\alpha_{11}$ plus a value which increases in proportion to an increase in $X_L$, and if $X_L$ has a predetermined value near the maximum manipulated variable $X_{L\ max}$, then $\alpha_1$ is maximized and becomes $\alpha_{12}$. When the operating signal $X_L$ is in a negative range, then $\alpha_1$ has a value inverted from $\alpha_1$ in the positive range. $\alpha_{11}$ is a value which causes no shock to occur when the actuator 6 is started to perform a fine operation, and $\alpha_{12}$ is a value which does not cause the actuator 6 to slacken when the operating lever 14 is manipulated to a maximum from the neutral position.

Figure 14:
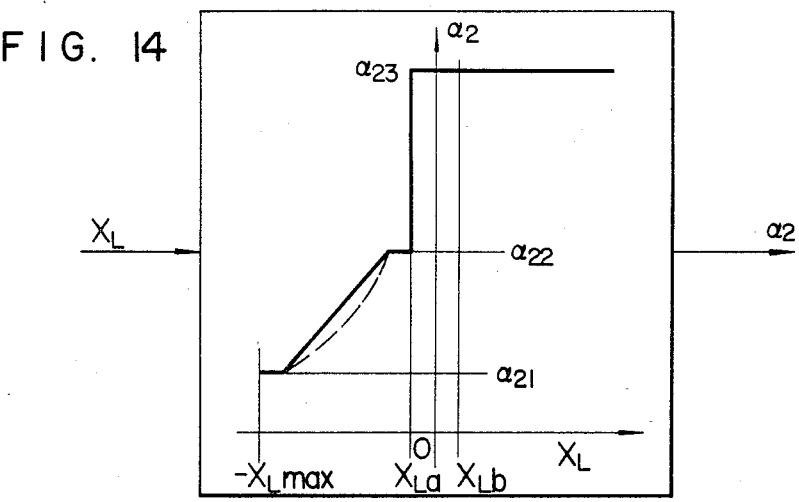
Figure 15:
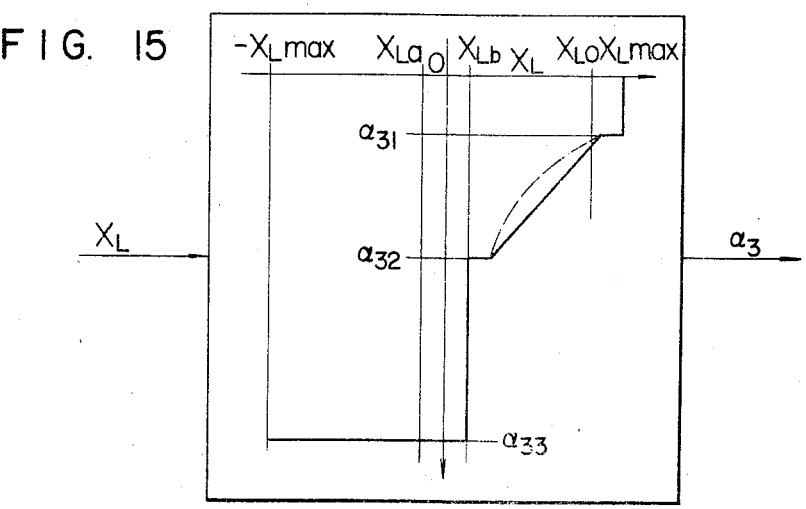

In the second predetermined maximum speed generating circuit 168, the operating signal $X_L$ is related to the second predetermined maximum speed $\alpha_2$ functionally as shown in FIG. 14. That is, $\alpha_2$ is in a positive range at all times. If the operating signal $X_L$ is a negative maximum manipulated variable $-X_{L\ max}$ or in the vicinity thereof, then $\alpha_2$ has a minimum value $\alpha_{21}$ and increases substantially linearly as $X_L$ increases from this value until $\alpha_2$ has an intermediate value $\alpha_{22}$ when the value of $X_L$ enters a predetermined range close to zero. If $X_L$ becomes higher than a lower limit $X_{La}$ of a dead zone in a pump control circuit subsequently to be described, then $\alpha_2$ has a maximum value $\alpha_{23}$. In the third predetermined maximum speed generating circuit 170, the operating signal $X_L$ is related to the third predetermined maximum speed $\alpha_3$ functionally as shown in FIG. 15 which is in reverse to the functional relation between $X_L$ and $\alpha_2$ shown in FIG. 14. That is, $\alpha_3$ is in a negative range at all times. If the operating signal $X_L$ is a positive maximum manipulated variable $X_{L\ max}$ or in the vicinity thereof, then the absolute value of $\alpha_3$ has a minimum value $\alpha_{31}$ and increases substantially linearly as the value of $X_L$ decreases from this value until $\alpha_3$ has an intermediate value $\alpha_{32}$ when $X_L$ enters a predetermined range close to zero. If $X_L$ becomes less than an upper limit $X_{Lb}$ of the dead zone of the pump control circuit subsequently to be described, then the absolute value of $\alpha_3$ has a maximum value $\alpha_{33}$.

In the second predetermined maximum speed generating circuit 168, $\alpha_{21}$ is a value which causes no shock to be suffered by the actuator when the operating lever is slightly withdrawn to effect fine adjustments of speed or when the operating lever is greatly withdrawn at the initial stage of deceleration with the operating lever being in a negative maximum manipulated variable position or in the vicinity thereof. In the third predetermined maximum speed generating circuit 170, $\alpha_{31}$ has the same value as $\alpha_{21}$ when the operating lever is in a positive maximum manipulated variable position or in the vicinity thereof. In the second predetermined maximum speed generating circuit 168, $\alpha_{23}$ is a value which is capable of obtaining quick deceleration of the actuator when operation of the actuator is interrupted in case of emergency, when positioning of the actuator is effected and when the direction of operation of the actuator is reversed with the operating lever being in a negative manipulated variable range. In the third predetermined maximum speed generating circuit 170, $\alpha_{33}$ is the same value as $\alpha_{23}$ when the operating lever is in a positive manipulated variable range. Thus, $\alpha_{23}$ and $|\alpha_{33}|$ have greater values than the maximum value $\alpha_{12}$ in the first predetermined maximum speed generating circuit 166.

Figure 16:
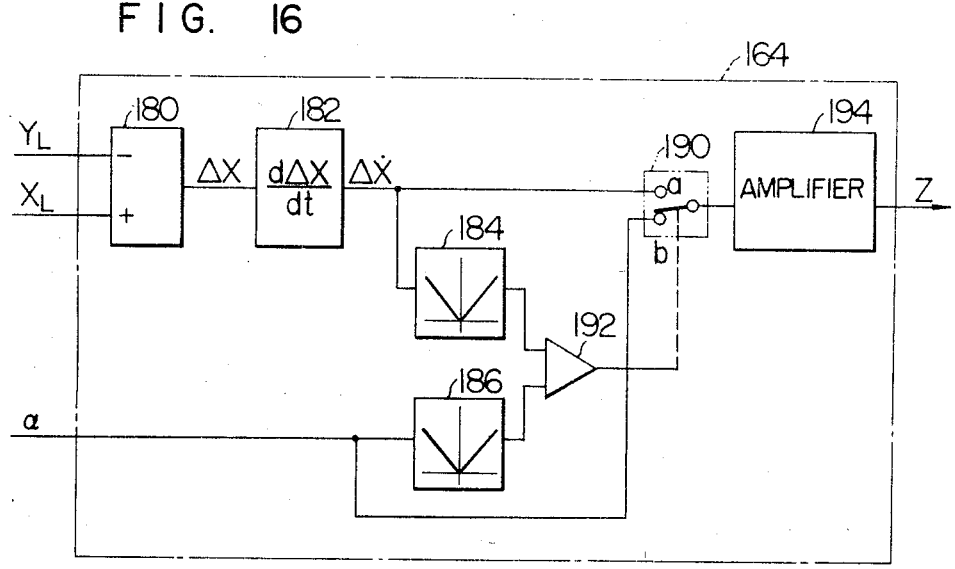
FIG. 16 is a circuit diagram showing in detail the pump control circuit of the embodiment shown in FIG. 12.

As shown in FIG. 16, the pump control circuit 164 comprises an adder 180 for deducting the swash plate position signal $Y_L$ from operating signal $X_L$, a differentiator 182 for differentiating the output of the adder 180 or a deviation signal $\Delta X$ and converting same into a changing rate $\Delta \dot{X}$ with respect to time, an absolute value circuit 184 for converting $\Delta \dot{X}$ into its absolute value $|\Delta \dot{X}|$, an absolute value circuit 186 for converting the predetermined maximum signal $\alpha$ to its absolute value $|\alpha|$, a comparator 192 inputting both $|\Delta \dot{X}|$ and $|\alpha|$ and providing a signal "0" and bringing a switch 190 into contact with a contact b when $|\Delta \dot{X}| \geq |\alpha|$ and providing a signal "1" and bringing the switch 190 into contact with a contact a when $|\Delta \dot{X}| \leq |\alpha|$, and an amplifier 194 amplifying the output signal of the switch 190 and providing it as a pump control signal Z. The contact a of the switch 190 receives $\Delta \dot{X}$, and the contact b thereof receives $\alpha$. Thus, when $|\Delta X| < |\alpha|$, the switch 190 is brought into contact with the contact a and generates a signal Z based on $\Delta X$; when $|\Delta \dot{X}| \geq |\alpha|$, the switch 190 is brought into contact with the contact b and generates a signal Z based on $\alpha$.

The pump control circuit 164 has an dead zone which renders the pump control signal Z zero when the operating signal $X_L$ is between $X_{La}$ and $X_{Lb}$ in FIGS. 13–15 to avoid inadvertent movement the actuator when the operating lever 14 slightly moves near its neutral position.

Operation of the control system 160 of the aforesaid construction will be described by referring to the time chart of FIG. 17.

Figure 17:
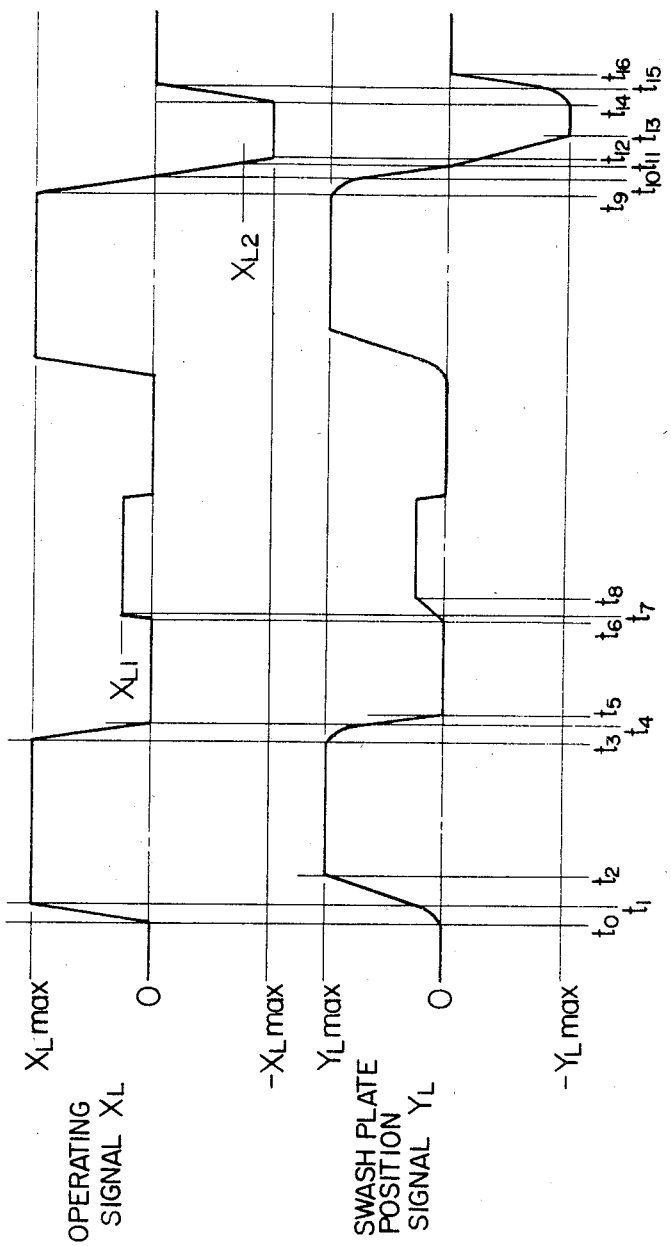
FIG. 17 is a time chart showing changes occurring in the operating signal $X_L$ and the swash plate position signal $Y_L$ in the embodiment shown in FIG. 12.

In FIG. 17, $t_o$ indicates a point in time at which the operating signal $X_L$ and swash plate position signal are both zero. If the operating lever 14 is suddenly moved to $X_{L\ max}$ from this point in time to $t_1$, then the comparator 172 provides "1" as an output because $Y_L \geq 0$ in the predetermined maximum speed generating circuit 162 shown in FIG. 12. Since the position of the swash plate 8 shows a change with a time lag behind a change in the operating signal because of speed control of the pump control circuit 164, $X_L \geq Y_L$ and comparator 174 provides "1" as an output, so that the inputs to EXOR circuit 176 are both "1" and EXOR circuit 176 provides as an output. This brings switch 178 into contact with the contact a and selects the first predetermined maximum speed generating circuit 166 having such function as shown in FIG. 13. Thus, the maximum speed setting circuit 162 provides the value of from $\alpha_{11}$ to $\alpha_{12}$ as predetermined maximum speeds between $t_o$ and $t_1$ and the pump control circuit 164 supplies a signal Z to the drive means 10 to move the swash plate 8 at a speed below the predetermined maximum speeds of from $\alpha_{11}$ to $\alpha_{12}$ to the position $Y_{L\ max}$ corresponding to the operating signal $X_{L\ max}$. Accordingly, between $t_o$ and $t_2$, the swash plate 8 initially moves at a slow speed below $\alpha_{12}$ and moves substantially at a normal speed of $\alpha_{12}$ substantially after $t_1$. This enables shockless smooth actuator startup and quick actuator operation to be obtained.

If the operating lever 14 is suddenly returned to the netural position from $t_3$ to $t_4$ in FIG. 17, then the output of comparator 172 shown in FIG. 12 remains "1" because $Y_L \geq 0$. However, speed control of the swash plate 8 effected by the pump control circuit 164 makes $X_L$ smaller than $Y_L$ and the output of comparator 174 becomes "0". Thus, the inputs to EXOR circuit 176 become "1" and "0" and the output thereof becomes "1" thereby to bring switch 178 into contact with the contact b. At this time, the output of comparator 172 is "1", so that switch 180 is brought into contact with the contact b. As a result, the third predetermined maximum speed generating circuit 170 of the contents shown in FIG. 15 is selected. Thus, between $t_3$ and $t_5$ in FIG. 17, circuit 162 provides the value of from $\alpha_{31}$ to $\alpha_{32}$ shown in FIG. 15 as the predetermined maximum speed before the operating signal enters the dead zone of from $X_{La}$ to $X_{Lb}$ and provides $\alpha_{33}$ as the predetermined maximum speed after the operating signal enters the dead zone, and the pump control circuit 164 returns the swash plate 8 to the neutral position at such predetermined maximum speed. Accordingly, in the initial stage of operation immediately after $t_3$, the swash plate 8 is moved at a slow speed of from $\alpha_{31}$ to $\alpha_{32}$ to enable deceleration of the actuator to be effected with minimized shock. Substantially between $t_4$ and $t_5$, the swash plate 8 is moved at a high speed of $\alpha_{33}$ to enable the actuator to be brought to a quick halt in case of emergency or when positioning of the load is effected. When it is desired to effect find speed adjustments of the actuator by moving the operating lever a very small distance to the vicinity of $X_{Lo}$ shown in FIG. 15 without returning same to the neutral position, for example, $\alpha_{31}$ is provided as a predetermined maximum speed. This moves the swash plat 8 at a slow speed of $\alpha_{31}$ to enable fine speed adjustments of the actuator to be effected readily.

Then, as shown at $t_6$–$t_7$ in FIG. 17, the operating lever is moved to a position $X_{L1}$. At this time, as in the case of $t_o$–$t_2$, $Y_L \geq 0$ and $X_L \geq Y_L$, so that comparators 172 and 174 provide "1" and EXOR circuit 176 provides "0" as outputs, so that the first predetermined maximum speed generating circuit 166 is selected. At this time, in circuit 166, the predetermined maximum speed is a constant or $\alpha_{11}$ while $X_L$ is between 0 and $X_{L1}$ as shown in FIG. 13, so that the pump control circuit 164 supplies to the drive means 10 a signal Z to move the swash plate 8 at a slow speed of $\alpha_{11}$ as indicated at $t_6$–$t_8$ in FIG. 17 to a position corresponding to $X_{L1}$. Thus, even if the operating lever is inadvertently moved suddenly when fine operation of the actuator is effected in which the manipulated variable is small, actuator suffers no shock and the fine operation can be readily performed.

Sudden movement of the operating lever from $X_L$ $_{max}$ to $-X_L$ $_{max}$ as indicated at $t_9$–$t_{12}$ in FIG. 17 will be discussed. From $t_9$ to $t_{10}$ and from $t_{10}$ to $t_{11}$, $Y_L \geq 0$ and $X_L < Y_L$, so that comparators 172 and 174 shown in FIG. 12 provide "1" and "0" respectively as outputs, and the third predetermined maximum speed generating circuit 170 of the contents shown in FIG. 15 is selected as is the case with $t_3$–$t_5$ shown in FIG. 17. Thus, $\alpha_{31}$– $\sim \alpha_{33}$ and $\alpha_{33}$ are provided from $t_9$ to $t_{10}$ and from $t_{10}$ to $t_{11}$ respectively as the predetermined maximum speed and supplied to the pump control circuit 164 thereby to control the swash plate 8 in the same manner as described by referring to $t_3$–$t_5$. As soon as $t_{11}$ is passed and $Y_L$ becomes $Y_L < 0$, the output of comparator 172 becomes "0". With the output of comparator 174 remaining "0", the output of EXOR circuit 176 becomes "0" and switch 178 is brought into contact with the contact a. Thus, the first predetermined maximum speed generating circuit 166 of the contents shown in FIG. 13 is selected. This causes the predetermined maximum speed to change from $\alpha_{13}$ to $\alpha_{14}$ as shown in FIG. 13 as the operating signal changes from $X_{L2}$ at a print in time of $t_{11}$ to $-X_L$ $_{max}$ at a point in time of $t_{12}$ and thereafter the predetermined maximum speed becomes $\alpha_{14}$. Thus, the swash plate is controlled at a high speed as indicated at $t_{11}$–$t_{13}$ in FIG. 17. This enables quick, shock-free operation to be obtained when the direction of movement of the actuator is reversed.

If the operating lever is moved from $-X_L$ $_{max}$ to the neutral position as indicated at $t_{14}$–$t_{15}$ in FIG. 17, $Y_L < 0$ and, because of swash plate speed control effected by pump control circuit 164, $X_L < Y_L$. Therefore, the outputs of comparators 172 and 174 and the output of EXOR circuit 176 are "1" and "1" respectively. Thus, switches 180 and 178 are brought into contact with the contacts a and b respectively, so that the second predetermined maximum speed generating circuit 168 of the contents shown in FIG. 14 is selected. Thus, during $t_{14}$–$t_{15}$, the predetermined maximum speed of from $\alpha_{21}$ to $\alpha_{23}$ shown in FIG. 13 is provided as an output to the pump control circuit 164, and $\alpha_3$ is provided as same. This moves the swash plate initially at a slow speed of below $\alpha_{23}$ as indicated at $t_{14}$–$t_{15}$ in FIG. 17 and then at a high speed of $\alpha_{23}$ to enable the same effects as described by referring to $t_3$–$t_5$ to be achieved.

Figure 18:
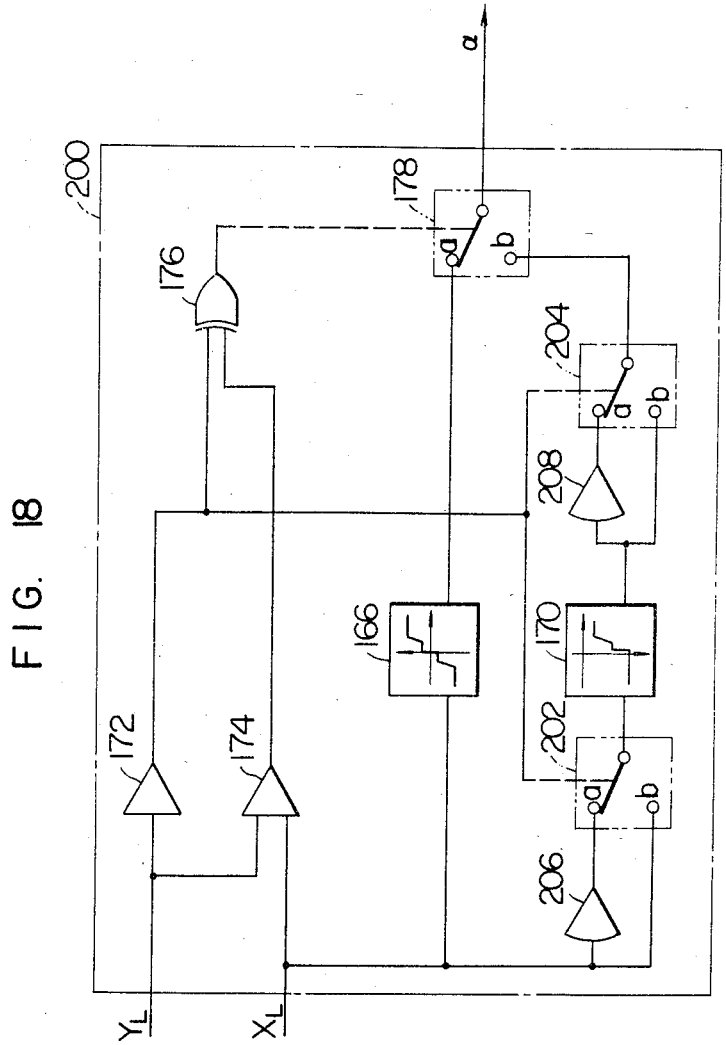
FIG. 18 is a circuit diagram of the swash plate maximum speed setting circuit of the embodiment shown in FIG. 12 in which the second and third predetermined maximum speed generating circuits are combined into a single circuit.

In the embodiment shown in FIG. 12, the swash plate maximum speed setting, circuit 162 comprises three predetermined maximum speed generating circuits 166, 168 and 170. However, since the circuits 168 and 170 may use functions in inverted relation to each other, it is possible to enable circuits 166 and 168, for example, to obtain the same function as the embodiment shown in FIG. 12. FIG. 18 shows a swash plate maximum speed setting circuit 200 incorporating this modification. In FIG. 18, the circuit 170 is referred to as a second predetermined maximum speed generating circuit.

The numerals 202 and 204 designate switches each brought into contact with a contact a when the output of comparator 172 is "0" and into contact with a contact b when it is "1". The numerals 206 and 208 designate inverter amplifiers each providing an output by inverting an input signal from positive to negative and vice versa.

In circuit 200, when $Y_L \geq 0$ and $X_L \geq Y_L$ and $X_L < 0$ and $Y_L < X_L$, the first predetermined maximum speed generating circuit 166 is selected as is the case with the circuit 162 shown in FIG. 12. When $Y_L \geq 0$ and $X_L < Y_L$, switches 202 and 204 are both brought into contact with the contact b to select the second predetermined maximum speed generating circuit 170 as it is as is the case with the circuit 162 shown in FIG. 12. When $Y_L < 0$ and $X_L \geq Y_L$, switches 202 and 204 are both brought into contact with the contact a. Thus, the operating signal $X_L$ inputted to the second predetermined maximum speed generating circuit 170 has its sign inverted by the inverter amplifier 206. For example, when $X_L = X_{L\ max}$, the input to the circuit 170 becomes $-X_{L\ max}$ and the $\alpha_{33}$ shown in FIG. 15 is read out and has its sign inverted by the inverter amplifier 208, so that $\alpha_{33}$ has the same meaning as the $\alpha_{23}$ shown in FIG. 14. If, in the circuit 162 shown in FIG. 12, the $\alpha_2$ and $\alpha_3$ of the second and third predetermined maximum speed generating circuits 168 and 170 respectively corresponding to the $X_L$ and $X_L$ that has had its sign inverted are equal to each other in absolute value, then the same operation as described by referring to the embodiment shown in FIG. 12 can be obtained with the circuit 200 shown in FIG. 18.

Figure 19:
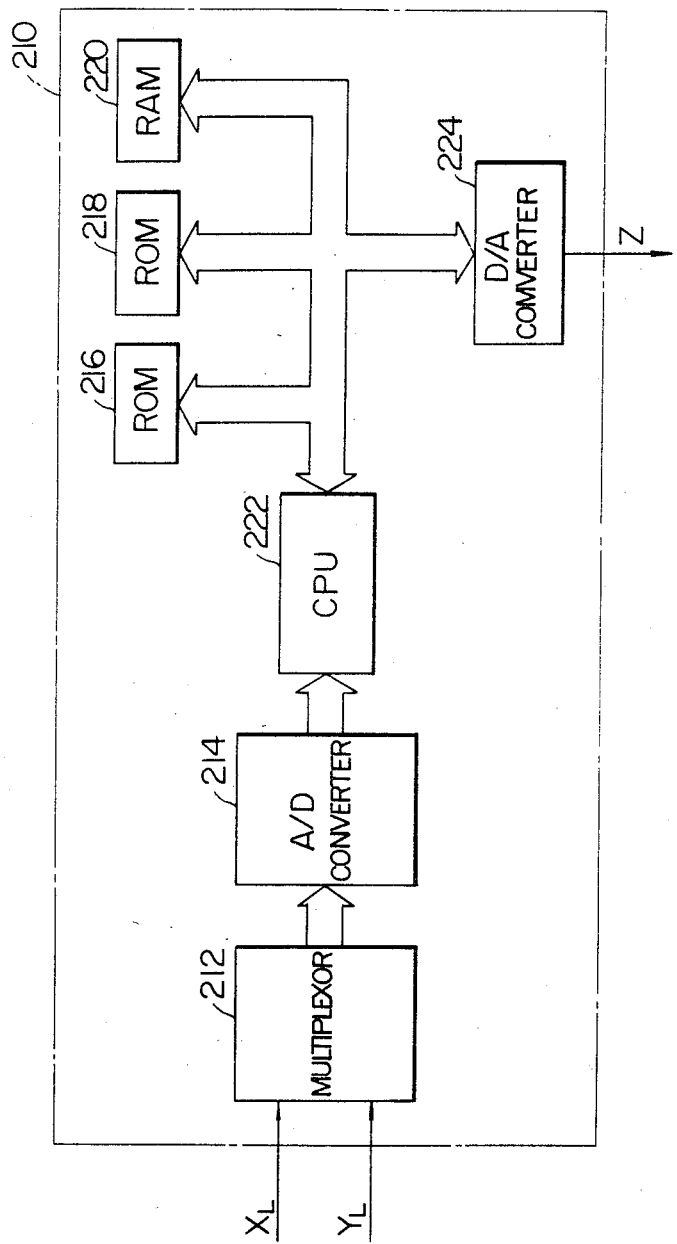
FIG. 19 is a block diagram showing an arithmetic control system in which the embodiment shown in FIG. 12 is carried out by using a microcomputer.

In the embodiment shown in FIG. 12, circuits 162 and 164 are each in the form of an electronic circuit. However, these two circuits can be formed as a single microcomputer. FIG. 19 shows a modification of the embodiment shown in FIG. 11 in which an arithmetic control means corresponding to the circuits 162 and 164 is generally indicated by the numeral 210.

The arithmetic control means 210 comprises a multiplexor 212 for switching between the swash plate position command signal or operating signal $X_L$ from the operating lever 14 and the swash plate position signal $Y_L$ from the displacement meter 16, an A/D converter 214 for converting the operating signal $X_L$ and swash plate position signal $Y_L$ which are analog signals into digital signals, an ROM memory 216 storing the process of operation of the arithmetic control means 210, an ROM memory 218 storing three tables (i), (ii) and (iii) of the $X_L$ and predetermined maximum speeds $\alpha_1$, $\alpha_2$ and $\alpha_3$ corresponding to the functions shown in FIGS. 13-15, an RAM memory 220 for temporarily storing the $X_L$ and $Y_L$ from the A/D converter and the numerals in the process of calculation, a central processing unit or CPU 222 for doing calculation on a swash plate drive signal in accordance with the operation process of ROM memory 216, and a D/A converter 224 for converting a signal from CPU 222 from a digital signal into an analog signal and supplying a control signal Z to the drive means 10.

FIG. 20 is a flow chart of the process of operation of the arithmetic control means 210 stored in ROM memory 210. Operation of the arithmetic control means 210 will be described by referring to the flow chart shown in FIG. 20.

In steps a-1 and a-2, the arithmetic control means 210 reads the operating signal $X_L$ and swash plate position signal $Y_L$ through the multiplexor 212 and A/D converter 214 shown in FIG. 19 and temporarily store same in RAM memory 220. In step a-3, it is judged whether or not $Y_L \geq 0$. If $Y_L \geq 0$, then the process proceeds to step a-4; if $Y_L < 0$, the process proceeds to step a-5. In step a-4, it is judged whether or not $X_L \geq Y_L$. If $X_L \geq Y_L$, the process proceeds to step a-7; if $X_L < X_L$, the process proceeds to step a-6. Meanwhile, in step a-5, it is judged whether or not $X_L < Y_L$. When $X_L < Y_L$, the process proceeds to step a-7; when $X_L \geq Y_L$, the process proceeds to step a-8. In step a-6, the predetermined maximum speed $\alpha_3$ corresponding to $X_L$ is read from the ROM table (iii) of the same contents as shown in FIG. 15 stored in ROM 218 and rendered $\alpha$. Likewise, in step a-7, $\alpha_1$ is read from the ROM table (i) of the same contents as shown in FIG. 13, and in step a-8, $\alpha_2$ is read from the ROM table (ii) of the same contents as shown in FIG. 14, $\alpha_1$ and $\alpha_2$ being rendered $\alpha$. Stated differently, in the operation from $t_0$ to $t_2$ shown in FIG. 17, the steps a-3, a-4 and a-7 are followed, and the ROM table (i) of the same contents as shown in FIG. 13 is selected. In the operation from $t_3$ to $t_5$, the steps a-3, a-4 and a-6 are followed and the ROM table (iii) of the same contents as shown in FIG. 15 is selected, and in the operation from $t_{14}$ to $t_{16}$, the steps a-3, a-5 and a-8 are followed and the ROM table (ii) of the same contents as shown in FIG. 14 is selected. The steps followed so far perform the same functions as the swash plate maximum speed setting circuit 162 shown in FIG. 12.

In step a-9, the value of the operating signal $X_L$ near zero position is revised to a value of zero position which is used as a command value for the swash plate 8 serving as a fresh $X_L$. In step a-10, it is judged whether or not $X_L = Y_L$. If $X_L = Y_L$, then the process proceeds to step a-15 in which the signal Z for stopping swash plate 8 is supplied from D/A converter 224 to drive means 10. Then the process proceeds to step a-11 before returning to the start. If $X_L = Y_L$ in step a-10, then the process proceeds to step a-11 in which $\mathring{X}_L$ is obtained by a formula $\mathring{X}_L = (X_L - Y_L)/t_c$ from $X_L$, $Y_L$ and the time $t_c$ elapsing from the "start" of the program (operation process) to step a-16. The $\mathring{X}_L$ represents a swash plate speed at which the swash plate is moved when the signal of the operating lever is used as a command signal. In step a-12, it is judged whether or not $|\mathring{X}_L| \leq |\alpha|$. If $|\mathring{X}_L| \leq |\alpha|$, then the process proceeds to step a-14 in which D/A converter 224 provides a signal Z for moving the swash plate at a speed of $\mathring{X}_L$. In step a-16, the process returns to the start. Meanwhile, in step a-12, the process proceeds to step a-13 when $|\mathring{X}_L| > |\alpha|$ and provides a signal for moving the swash plate 8 at a speed $\alpha$.

By virtue of the aforesaid construction and operation, the arithmetic control means 210 is capable of performing the same function as the circuits 162 and 164 shown in FIG. 12.

In the predetermined maximum speed generating circuits 166, 168 and 170, the relations between $\alpha_1$, $\alpha_2$ and $\alpha_3$ and $X_L$ have been described as having characteristics indicated by solid lines in FIGS. 13-15. However, $\alpha_1$, $\alpha_2$ and $\alpha_3$ may be varied into curved as indicated by broken lines or may be changed stepwise.

From the foregoing description, it will be appreciated that in the embodiment shown in FIGS. 12-20, the operating speed of the displacement volume varying member of the variable displacement hydraulic pump is controlled, as in the embodiment shown in FIGS. 1-4, in such a manner that it is restricted to a value below the first predetermined maximum speed in normal operation in which the manipulated variable is great, so that it is possible to keep acceleration of the actuator to a level below a predetermined value. Thus, the actuator can be made to perform a smooth operation free from shock. When the actuator is brought to a halt in case of emergency, when the load of the actuator is positioned and when the direction of operation of the actuator is reversed, the operating speed of the displacement volume varying member is controlled in such a manner that the second or third predetermined maximum speed higher than the first predetermined maximum speed is selected to cause the actuator to operate more quickly.

In the embodiment shown in FIGS. 12-20, the following additional effect can be achieved as is the case with the embodiment shown in FIGS. 9-11. The first predetermined maximum speed has its absolute value increased as the absolute value of the operating signal increases, so that the actuator can be made to perform a shock-free, smooth operation even when the actuator is started and when fine operation is performed.

In the embodiment shown in FIGS. 12-20, the second and third predetermined maximum speeds have their absolute values increased as the operating signal becomes smaller or larger depending on the direction in which the operating signal undergoes a change. By virtue of this feature, no shock is produced when the operating lever located in the maximum position or in the vicinity thereof is slightly withdrawn, thereby enabling fine speed adjustments to be effected radially. Also, when the actuator is brought to a halt in case of emergency, when the load of the actuator is positioned and when the direction of operation of the actuator is reversed, it is possible to make the actuator perform operation quickly.

What is claimed is:

1. A control system for hydraulic circuit means including a variable displacement hydraulic pump and an actuator driven by said pump, the operating speed of said actuator being controlled by the position of a displacement volume varying member of said pump, the control system comprising operating means for generating an operating signal for giving a command with regard to the position of said displacement volume varying member of said pump and thus the operating speed of the actuator, detector means for detecting an actual position of the displacement volume varying member and generating a signal indicative of the actual position, and pump control means for controlling said displacement volume varying member based on said operating signal and said detector signal while restricting the operating speed of the displacement volume varying member to a level below a predetermined maximum speed, wherein said control system comprises:

maximum speed setting means selectively setting one of a first predetermined maximum speed and a second predetermined maximum speed higher than said first predetermined maximum speed as said predetermined maximum speed for the operating speed of the displacement volume varying member, said first predetermined maximum speed being of the value for allowing the actuator to perform smooth operation upon normal operation thereof and said second predetermined maximum speed being of the value for allowing the actuator to perform swift operation upon emergency halting thereof, rapid reversing of the operation direction thereof, or accurate positioning thereof, said maximum speed setting means including switch means having a first position to select said first predetermined maximum speed and a second position to select said second predetermined maximum speed and connected to said pump control means for providing the selected one of said first and second predetermined maximum speeds as an output to said pump control means, and switch actuating means associated with said operating means and detector means for actuating said switch means so as to take one of said first and second positions, said switch actuating means being operative to actuate said switch means so as to take said first position and thus select the first predetermined maximum speed when said operating means is operated such that the direction of operation of the actuator commanded by the operating signal is the same as the actual direction of operation thereof represented by said detector means signal indicative of the actual position of the displacement volume varying member and to actuate said switch means so as to take said second position and thus select the second position and thus select the second predetermined maximum speed when said operating means is operated such that the operating signal commands returning of the displacement volume varying member into a neutral position or the direction of operation of the actuator commanded by the operating signal is opposite to the actual direction of operation thereof represented by said detector means signal indicative of the actual position of the displacement volume varying member, whereby the pump control means effects speed control of the displacement volume varying member based on the first and second predetermined maximum speed selected by the maximum speed setting means.

2. A control system as claimed in claim 1, wherein said maximum speed setting means comprises a first means for generating said first predetermined maximum speed, and a second means for generating said second predetermined maximum speed, said first and second predetermined maximum speeds each having a constant value.

3. A control system as claimed in claim 2, wherein said switch actuating means is operative to bring said switch means to said first position when the operating signal and the detector signal are both positive or negative and to bring said switch means to said second position when the operating signal and the detector signal differ from each other in sign or when the operating signal has a value in the vicinity of zero.

4. A control system as claimed in claim 2 in which said hydraulic circuit means further includes a directional control valve for causing said actuator to operate in normal and reverse directions when valve control signals of "1" and "0" are received respectively, wherein said switch actuating means is operative to bring the switch means to said first position when the operating signal is positive and said valve control signal is "1" or when the operating signal is negative and the valve control signal is "0" and to bring the switch means to said second position when the operating signal is positive and the valve control signal is "0", when the operating signal is negative and the valve control signal is "1" or when the operating signal has a value in the vicinity of zero.

5. A control system as claimed in claim 1, wherein said maximum speed setting means comprises a first means for generating said first predetermined maximum speed, and a second means for generating said second predetermined maximum speed, said second predetermined maximum speed being in functional relation to the operating signal in such a manner that the absolute value of the second predetermined maximum speed increases as the operating signal changes so as to move the displacement volume varying member from one of its normal and reverse maximum positions toward its neutral position and further increases as the operating signal changes so as to move the displacement volume varying member from near the neutral position toward the other maximum position.

6. A control system as claimed in claim 1, wherein said maximum speed setting means comprises a first means for generating said first predetermined maximum speed, and second and third means for generating said second predetermined maximum speed, said second predetermined maximum speed generated by said second means being positive in value and in functional relation to the operating signal in such a manner that its value increases as the operating signal changes so as to move the displacement volume varying member from its reverse maximum position towards its neutral position and further increases as the operating signal changes so as to move the displacement volume varying member from near its neutral position towards its normal maximum position, and said second predetermined maximum speed generated by said third means being negative in value and in functional relation to the operating signal in such a manner that the absolute value of the second predetermined maximum speed increases as the operating signal changes so as to move the displacement volume varying member from its normal maximum position towards its neutral position and further increases as the operating signal changes so as to move the displacement volume varying member from near its neutral position towards its reverse maximum position.

7. A control system as claimed in claim 5 or 6, wherein said first predetermined maximum speed is in functional relation to the operating signal in such a manner that the absolute value of the first predetermined maximum speed increases as the operating signal changes so as to move the displacement volume varying member away from its neutral position.

8. A control system as claimed in claim 5 or 6, wherein said first predetermined maximum speed is in functional relation to the operating signal in such a manner that the first predetermined maximum speed has a positive value which increases as the operating signal changes so as to move the displacement volume varying member from its neutral position toward the normal maximum position and the first predetermined maximum speed has a negative value of which the absolute value increases as the operating signal changes so as to move the displacement volume varying member from its neutral position toward the reverse maximum position.

9. A control system as claimed in claim 6, wherein said switch means includes a first switch means having a first position in which said second predetermined maximum speed is provided as an output and a second position in which said third predetermined maximum speed is provided as an output, and a second switch means having a first position in which said first predetermined maximum is provided as an output to said pump control means and a second position in which the output of said first switch means is provided as an output to said pump control means, and said switch actuating means includes a first switch actuating means operative to bring said first switch means to said first position when the detector signal is negative and to said second position when it is positive, and a second switch actuating means operative to bring said second switch means to said first position when the operating signal is greater than the detector signal and the latter is positive or when the operating signal is smaller than the detector signal and the latter is negative and to bring said second switch means to said second position when the operating signal is smaller than the detector signal and the latter is positive or when the operating signal is greater than the detector signal and the latter is negative.

* * * * *